United States Patent
Oda et al.

(10) Patent No.: US 9,559,771 B2
(45) Date of Patent: Jan. 31, 2017

(54) OPTICAL TRANSMISSION DEVICE, NODE DEVICE, OPTICAL TRANSMISSION METHOD, AND OPTICAL TRANSMISSION SYSTEM

(71) Applicant: FUJITSU LIMITED, Kawasaki-shi, Kanagawa (JP)

(72) Inventors: Shoichiro Oda, Fuchu (JP); Takeshi Hoshida, Kawasaki (JP); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 502 days.

(21) Appl. No.: 14/079,196

(22) Filed: Nov. 13, 2013

(65) Prior Publication Data

US 2014/0140692 A1    May 22, 2014

(30) Foreign Application Priority Data

Nov. 21, 2012   (JP) .................................. 2012-255534

(51) Int. Cl.
    *H04B 10/572* (2013.01)
    *H04B 10/50* (2013.01)
    (Continued)

(52) U.S. Cl.
    CPC ............ *H04B 10/07* (2013.01); *H04B 10/506* (2013.01); *H04B 10/5057* (2013.01);
    (Continued)

(58) Field of Classification Search
    CPC ... H04B 10/5057; H04B 10/506; H04B 10/07; H04B 2210/074; H04J 14/0212; H04J 14/0267; H04J 14/0204; H04J 14/0276
    (Continued)

(56) References Cited

U.S. PATENT DOCUMENTS 5,589,970 A  * 12/1996 Lyu ..................... H04B 10/572
                                                    398/14
5,673,129 A  *  9/1997 Mizrahi .............. G02B 6/2932
                                                    385/24
(Continued)

FOREIGN PATENT DOCUMENTS

JP          10-200482         7/1998
JP          11-331224         11/1999
(Continued)

OTHER PUBLICATIONS

Extended European Search Report dated Mar. 27, 2014 for corresponding European Patent Application No. 13192447.4.
(Continued)

*Primary Examiner* — Ken N Vanderpuye
*Assistant Examiner* — Dibson Sanchez
(74) *Attorney, Agent, or Firm* — Fujitsu Patent Center

(57) ABSTRACT

An optical transmission device includes a transmission unit, a filter unit, a detection unit, and a control unit. The transmission unit superimposes identical superimposition signals of a frequency modulation method on a plurality of optical signals that have identical destinations and that have adjacent wavelengths, and transmits resultant signals as one communication signal. The filter unit filters part of two optical signals having adjacent wavelengths from among the plurality of optical signals included in the communication signal. The detection unit generates an electric signal of a detection level representing an optical intensity of the two optical signals that were filtered by the filter unit. The control unit controls timings of superimposing the superimposition signals on the two optical signals respectively by controlling the transmission unit so that variation in the detection level becomes smaller.

9 Claims, 16 Drawing Sheets

(51) Int. Cl.
*H04B 10/07* (2013.01)
*H04J 14/02* (2006.01)

(52) U.S. Cl.
CPC ...... *H04J 14/0204* (2013.01); *H04J 14/0212* (2013.01); *H04J 14/0267* (2013.01); *H04B 2210/074* (2013.01); *H04J 14/0276* (2013.01)

(58) Field of Classification Search
USPC ..................................... 398/9–38, 182–201
See application file for complete search history.

(56) References Cited

U.S. PATENT DOCUMENTS

| | | | | |
|---|---|---|---|---|
| 5,805,321 A * | 9/1998 | Ooi | G02F 1/0123 | 398/183 |
| 6,006,111 A * | 12/1999 | Rowland | H03F 3/602 | 330/124 R |
| 6,078,414 A * | 6/2000 | Iwano | H04B 10/506 | 398/1 |
| 6,118,562 A * | 9/2000 | Lee | H01S 5/0687 | 372/23 |
| 6,233,261 B1 * | 5/2001 | Mesh | H01S 5/40 | 372/20 |
| 6,349,103 B1 * | 2/2002 | Chung | H01S 5/0687 | 372/20 |
| 6,369,923 B1 * | 4/2002 | Kuo | H04B 10/504 | 398/91 |
| 6,396,603 B1 * | 5/2002 | Kim | H04B 10/504 | 398/192 |
| 6,469,812 B2 * | 10/2002 | McKiel, Jr. | H04J 14/0298 | 398/9 |
| 6,556,328 B1 * | 4/2003 | Tanaka | H04B 10/506 | 372/29.011 |
| 6,567,198 B1 * | 5/2003 | Kang | H04B 10/572 | 398/192 |
| 6,661,974 B1 * | 12/2003 | Akiyama | H04B 10/2513 | 398/158 |
| 6,735,395 B1 * | 5/2004 | Bai | H04B 10/504 | 372/31 |
| 6,906,804 B2 * | 6/2005 | Einstein | G01J 9/04 | 356/484 |
| 7,271,948 B1 * | 9/2007 | Wang | H04B 10/2537 | 359/334 |
| 7,469,102 B2 * | 12/2008 | Lee | H04J 14/02 | 372/32 |
| 7,512,342 B1 | 3/2009 | Feuer et al. | | |
| 7,580,632 B1 | 8/2009 | Feuer et al. | | |
| 8,155,524 B2 * | 4/2012 | Wang | H04B 10/2537 | 398/68 |
| 8,412,047 B2 * | 4/2013 | Tanaka | H04B 10/5053 | 398/102 |
| 8,611,750 B2 * | 12/2013 | Lei | H04B 10/506 | 398/17 |
| 8,693,867 B2 * | 4/2014 | Littler | H01S 5/0687 | 372/29.02 |
| 8,693,872 B2 * | 4/2014 | Wu | H04B 10/572 | 398/43 |
| 8,983,306 B2 * | 3/2015 | Bernasconi | H04B 10/506 | 398/195 |
| 2001/0013962 A1 * | 8/2001 | Li | H04B 10/506 | 398/82 |
| 2002/0048063 A1 * | 4/2002 | Jung | H04B 10/506 | 398/95 |
| 2002/0063922 A1 * | 5/2002 | Berger | H04B 10/506 | 398/95 |
| 2003/0025957 A1 * | 2/2003 | Jayakumar | H04B 10/00 | 398/5 |
| 2003/0095736 A1 * | 5/2003 | Kish, Jr. | B82Y 20/00 | 385/14 |
| 2003/0112836 A1 * | 6/2003 | Kim | H01S 5/0687 | 372/18 |
| 2004/0043795 A1 * | 3/2004 | Zancewicz | H01Q 3/2605 | 455/562.1 |
| 2007/0092177 A1 * | 4/2007 | Nilsson | B82Y 20/00 | 385/14 |
| 2008/0247756 A1 * | 10/2008 | Wang | H04B 10/2537 | 398/72 |
| 2008/0273874 A1 * | 11/2008 | Ramachandran | H04B 10/25751 | 398/43 |
| 2009/0028552 A1 * | 1/2009 | Zhang | H04B 10/572 | 398/25 |
| 2009/0169210 A1 | 7/2009 | Feuer et al. | | |
| 2009/0208215 A1 * | 8/2009 | Bai | H04B 10/506 | 398/79 |
| 2009/0232493 A1 * | 9/2009 | Tu | H04B 10/572 | 398/17 |
| 2010/0014872 A1 * | 1/2010 | Fu | H04B 10/25137 | 398/158 |
| 2010/0080568 A1 | 4/2010 | Feuer et al. | | |
| 2011/0044702 A1 * | 2/2011 | Mizuguchi | H04B 10/5053 | 398/184 |
| 2011/0280581 A1 * | 11/2011 | Chann | G02B 6/2931 | 398/98 |
| 2012/0141130 A1 * | 6/2012 | Nakashima | H04B 10/572 | 398/82 |
| 2012/0170937 A1 * | 7/2012 | Van Leeuwen | H04B 10/07957 | 398/76 |

FOREIGN PATENT DOCUMENTS

| | | |
|---|---|---|
| JP | 2008-263590 | 10/2008 |
| JP | 2011-141670 | 7/2011 |

OTHER PUBLICATIONS

Andreas Leven, et al., "Frequency Estimation in Intradyne Reception," IEEE Photonics Technology Letters, vol. 19, No. 6, pp. 366-368, Mar. 15, 2007.

Lei Li, et al., "Wide-range, Accurate and Simple Digital Frequency Offset Compensator for Optical Coherent Receivers," paper OWT4, OFC/NFOEC 2008.

Vinay A. Vaishampayan, et al., "An Overlay Architecture for Managing Lightpaths in Optically Routed Networks," IEEE Transactions on Communications, vol. 53, No. 10, pp. 1729-1737, Oct. 2005.

\* cited by examiner

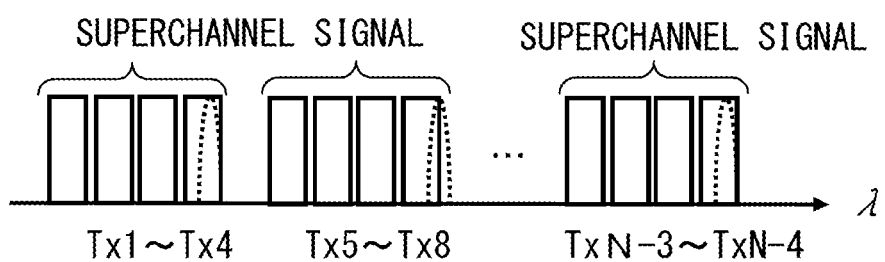
F I G. 8A
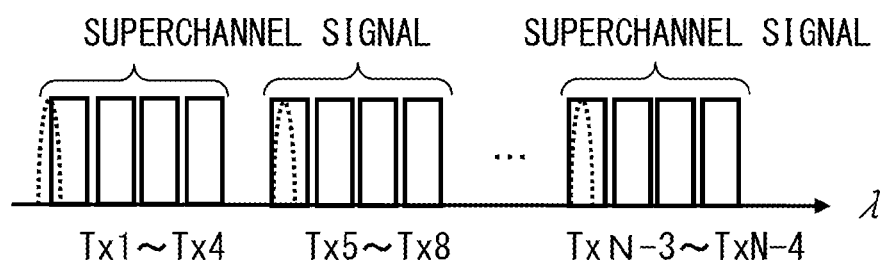
F I G. 8B

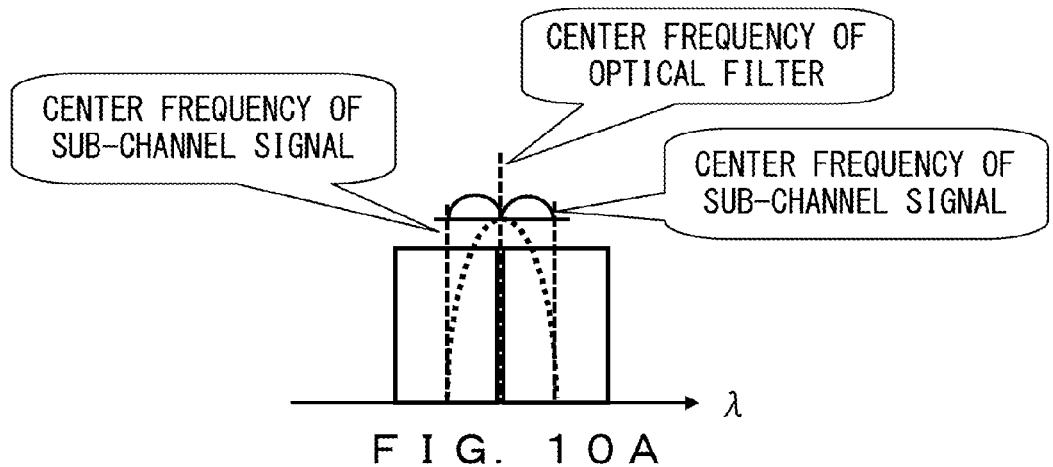
F I G. 1 0 A
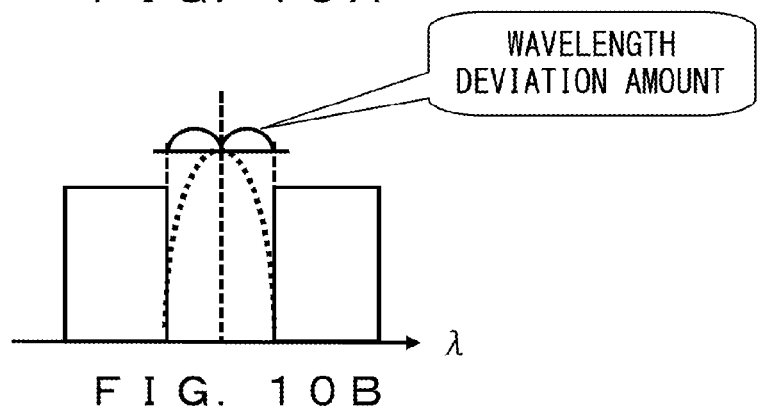
F I G. 1 0 B
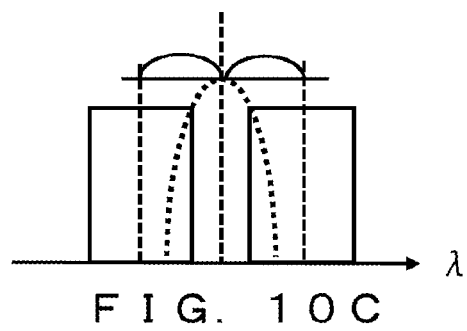
F I G. 1 0 C

OPTICAL TRANSMISSION DEVICE, NODE DEVICE, OPTICAL TRANSMISSION METHOD, AND OPTICAL TRANSMISSION SYSTEM

CROSS-REFERENCE TO RELATED APPLICATION

This application is based upon and claims the benefit of priority of the prior Japanese Patent Application No. 2012-255534, filed on Nov. 21, 2012, the entire contents of which are incorporated herein by reference.

FIELD

The embodiments discussed herein are related to a technique of controlling optical transmission.

BACKGROUND

Photonic networks provided with a reconfigurable optical add-drop multiplexer and/or a wavelength cross connect have been proposed and developed. A reconfigurable optical add-drop multiplexer (ROADM) is capable of dropping an optical signal of a desired wavelength from a WDM (Wavelength Division Multiplexing) signal so as to guide the signal to a client and of adding a client signal of an arbitrary wavelength to a WDM signal. A wavelength cross connect (WXC or PXC: Photonic Cross Connect) is capable of controlling routes of optical signals for each wavelength without converting these signals into electric signals.

In a photonic network as described above, a plurality of optical paths (wavelength paths) that use the same wavelength are sometimes set. Accordingly, in order to construct and operate networks reliably, a method for example in which path IDs for identifying respective optical paths are superimposed on an optical signal to be transmitted is proposed. In such a case, node devices (reconfigurable optical add-drop multiplexers, wavelength cross connects, etc., in this example) in a photonic network are provided with a function of detecting a path ID superimposed on an optical signal. This enables secure identification of each optical path in a node device, making it possible to monitor, detect, and avoid failures such as connection of an optical fiber to a wrong port.

As a technique of managing optical paths, a method including the following processes is proposed. Specifically, at least one sub data stream is coupled with at least one payload data stream so as to generate a synthetic-electricity data stream. The synthetic-electricity data stream is supplied to an optical modulator so as to generate an optical signal. An optical receiver having an operation frequency lower than the half the speed of the synthetic-electricity data stream detects the optical signal. Then, the sub data stream is restored from the electric output of the optical receiver.

As related techniques, U.S. Pat. No. 7,580,632, U.S. Pat. No. 7,512,342, U.S. Patent Publication No. 2009/0169210, U.S. Patent Publication No. 2010/0080568, Japanese Laid-open Patent Publication No. 11-331224, Japanese Laid-open Patent Publication No. 2008-263590, and Vinay A. Vaishampayan and Mark D. Feuer, "An Overlay Architecture for Managing Lightpaths in Optically Routed Networks," IEEE Transactions on Communications, Vol. 53, No. 10, October 2005 are known.

SUMMARY

According to an aspect of the embodiments, an optical transmission device includes a transmission unit, a filter unit, a detection unit, and a control unit. The transmission unit superimposes identical superimposition signals of a frequency modulation method on a plurality of optical signals that have identical destinations and that have adjacent wavelengths, and transmits resultant signals as one communication signal. The filter unit filters part of two optical signals having adjacent wavelengths from among the plurality of optical signals included in the communication signal. The detection unit generates an electric signal of a detection level representing an optical intensity of the two optical signals that were filtered by the filter unit. The control unit controls timings of superimposing the superimposition signals on the two optical signals respectively by controlling the transmission unit so that variation in the detection level becomes smaller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8A illustrates the passband of an optical filter of a reception circuit;
FIG. 8B illustrates the passband of an optical filter of a reception circuit;
FIG. 10A illustrates an example of setting of wavelength deviation amounts on the basis of frequency modulation;
FIG. 10B illustrates an example of setting of wavelength deviation amounts on the basis of frequency modulation;
FIG. 10C illustrates an example of setting of wavelength deviation amounts on the basis of frequency modulation.

DESCRIPTION OF EMBODIMENTS

Figure 1:
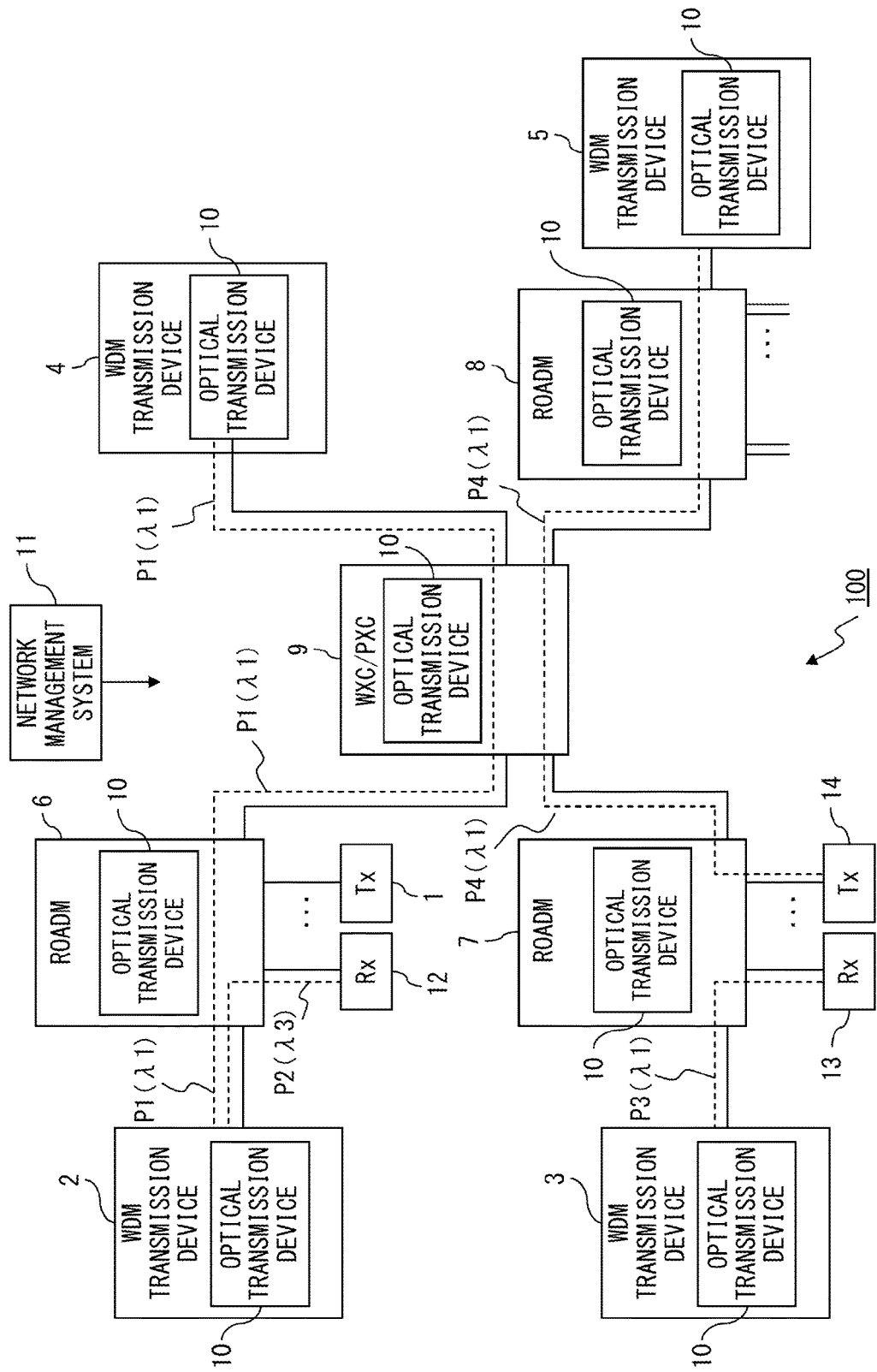
FIG. 1 illustrates an example of an optical transmission system for which an optical transmission device is used.

In the field of optical transmission, techniques for enhancing the frequency use efficiency such as Orthogonal Frequency Division Multiplexing (OFDM), Nyquist-WDM, and the like, are known. Further, the concept of a super-channel, which performs wavelength multiplexing on a plurality of optical signals (also referred to as sub-channel signals hereinafter) at a density higher than the conventional WDM by using OFDM or Nyquist-WDM so as to treat the optical signals as one super-channel signal (also referred to as a communication signal hereinafter), has been introduced to the field of optical transmission.

When the above described optical transmission technique that superimposes signals representing information such as path IDs or the like on optical signals is applied to a super-channel signal used in a super-channel, the following problems arise.

In the above optical transmission technique, when, for example, the wavelength intervals of optical signals included in a WDM signal are narrowed, crosstalk may occur between adjacent optical signals. Accordingly, it is assumed that when the above optical transmission technique is applied to a super-channel signal, crosstalk occurs between adjacent sub-channel signals at the timing at which the superimposing of the signals narrows the wavelength intervals between adjacent sub-channel signals, leading to deterioration of the transmission performance of superimposition signals and the reception sensitivity.

Accordingly, the present embodiments provide a technique of suppressing crosstalk between sub-channel signals.

Explanations will be given for an optical transmission device according to an embodiment.

The optical transmission device according to an embodiment includes a signal generation circuit, a splitter, an optical filter, a detector, and a control circuit.

The signal generation circuit superimposes identical frequency-modulated signals (referred to as a superimposition signal, hereinafter) respectively on a plurality of sub channels that have identical destinations and have adjacent wavelengths, and transmits the resultant signals as one super-channel signal.

The splitter is connected to a stage later than the signal generation circuit, and splits the super-channel signal so as to input the resultant signals to the optical filter.

The optical filter filters part of two sub-channel signals having adjacent wavelengths simultaneously from among sub channels included in the super-channel signal.

The detector generates an electric signal of a detection level that is in proportion to the optical intensity of the two sub-channel signals on the basis of the two sub channels that received the filtering by the optical filter.

The control circuit adjusts the timing of superimposing a superimposition signal for each of the two sub-channel signals in such a manner that variation in detection levels of electric signals is made smaller. Also, the control circuit controls the transmitter so that the same superimposition signal is superimposed on each of the two or more sub-channel signals at the adjusted timing. Also, the control circuit sets the optical filter in such a manner that the filter performs filtering on part of other two sub-channel signals, when the difference in the values between the maximum and minimum levels of varying detection levels has become smaller than a threshold. Note that a small difference in detection levels of electric signals means that the wavelength intervals between two sub-channel signals are always consistent, i.e., superimposition signals that are superimposed on two sub-channel signals are always switched at the same timing (also referred to as synchronization of superimposition signals, hereinafter).

The optical transmission device adjusts detection levels between all sub channels so that superimposition signals are synchronized in the order starting from the shorter wavelength or starting from the longer wavelength of the two sub-channel signals included in the super-channel signal.

Thereby, the optical transmission device can superimpose, on respective sub-channel signals included in a super-channel signal, superimposition signals that are identical and that switch at the same timing. This makes it possible to suppress crosstalk between sub-channel signals because the wavelength intervals of respective sub-channel signals can be kept to the set intervals even when superimposition signals are superimposed on respective sub-channel signals included in a super-channel signal.

FIG. 1 illustrates an example of an optical transmission system for which an optical transmission device is used.

In the explanations below, a superimposition signal is a signal representing the path ID that specifies an optical path. However, a superimposition signal may be a signal that represents information desired by a user, without being limited to a path ID.

An optical transmission system 1 illustrated in FIG. 1 includes WDM transmission devices 2 through 5, reconfigurable optical add/drop multiplexers 6 through 8, a wavelength cross connect 9, optical transmission devices 10, and a network management system (NMS) 11.

The WDM transmission devices 2, 3, and 5 are connected to the reconfigurable optical add/drop multiplexers 6, 7, and 8, respectively through optical fiber lines. The reconfigurable optical add/drop multiplexers 6 through 8 are connected to the wavelength cross connect 9 through optical fiber lines. The WDM transmission device 4 is connected to the wavelength cross connect 9 through an optical fiber line. Also, one or a plurality of optical amplifiers may be set on respective optical fiber lines.

The WDM transmission devices 2 through 5 include the optical transmission devices 10, and generate super-channel signals based on signals input from the network management system 11, which will be described later, and client lines so as to insert the super-channel signals into WDM signals.

The optical transmission device 10 includes a signal generation circuit that generates a super-channel signal, which includes a plurality of sub-channel signals having different wavelengths and which is treated as one signal, and that transmits a WDM signal including a plurality of super-channel signals having different wavelengths. Also, the optical transmission device 10 includes a reception circuit that detects a pulse ID signal superimposed on a super-channel signal so as to obtain a path ID.

The reconfigurable optical add/drop multiplexers 6 through 8 make specified wavelength channels pass from among input WDM signals. Also, the reconfigurable optical add/drop multiplexers 6 through 8 drop super-channel signals having specified wavelengths from among input WDM signals so as to guide the dropped signals to client lines. Further, the reconfigurable optical add/drop multiplexers 6 through 8 have the optical transmission devices 10, and generate super-channel signals based on signals input from the network management system 11 and client lines so as to insert the generated signals into a WDM signal.

The wavelength cross connect 9 includes a plurality of input ports and output ports, and guides an input WDM signal to an output port so that a specified optical path is realized. Note that, although not represented in the figures, the wavelength cross connect 9 may include a function of dropping signals to client lines and adding signals to client lines or the network management system 11 using the optical transmission device 10, similarly to the reconfigurable optical add/drop multiplexers 6 through 8.

The network management system 11 sets an optical path specified by a user in the optical transmission system 1. In other words, the network management system 11 controls the WDM transmission devices 2 through 5, the reconfigurable optical add/drop multiplexers 6 through 8, and the wavelength cross connect 9, so that an optical path specified by a user is realized. The network management system 11 may configure a so-called management plane based on a concentrated control system, may configure a so-called control plane based on a distributed control system, or may be a system including both of them.

In the example illustrated in FIG. 1, optical paths P1 through P4 are set. Each of the optical paths is drawn with a dashed line. The optical path P1 transmits a super-channel signal from the WDM transmission device 2 to the WDM transmission device 4 via the reconfigurable optical add/drop multiplexer 6 and the wavelength cross connect 9. The optical path P2 transmits a super-channel signal from the WDM transmission device 2 to a client terminal 12 via the reconfigurable optical add/drop multiplexers 6. The optical path P3 transmits a super-channel signal from the WDM transmission device 3 to a client terminal 13 via the reconfigurable optical add/drop multiplexer 7. The optical path P4 transmits a super-channel signal from a client terminal 14 to the WDM transmission device 5 via the reconfigurable optical add/drop multiplexer 7, the wavelength cross connect 9 and the reconfigurable optical add/drop multiplexer 8. The respective optical paths P1 through P4 may transmit super-channel signals bi-directionally.

In the optical transmission system 1 of the above configuration, the network management system 11 may assign the same wavelength to different optical paths in order to utilize communication resources efficiently or flexibly. In the example illustrated in FIG. 1, wavelengths λ1, λ3, λ1, and λ1 have been assigned to optical paths P1, P2, P3, and P4.

In some cases, users or network administrators desire to confirm whether or not optical paths are set correctly. However, when the same wavelength has been assigned to a plurality of optical paths, it is difficult to identify each optical path only by monitoring the spectrum of each wavelength channel. For example, it is difficult to identify optical paths P1 and P4 only by monitoring the spectrum of each wavelength channel in the wavelength cross connect 9.

Accordingly, the network management system 11 assigns path IDs to respective optical paths. Then, the transmission source device of an optical path superimposes, as a superimposition signal, a path ID signal representing a path ID on a super-channel signal to be transmitted through the optical path. For example, the WDM transmission device 2 superimposes a path ID signal representing "path ID=1" to a super-channel signal to be transmitted through optical path1, and superimposes a path ID signal representing "path ID=2" on a super-channel signal to be transmitted through optical path2.

Note that it is not necessary to provide the optical transmission devices 10 to all node devices such as the reconfigurable optical add/drop multiplexers 6 through 8 and the wavelength cross connect 9. Also, one node device may include a plurality of the optical transmission devices 10. Also, the optical transmission device 10 may be included in a node device or may be connected to a node device in a detachable manner.

Figure 2:
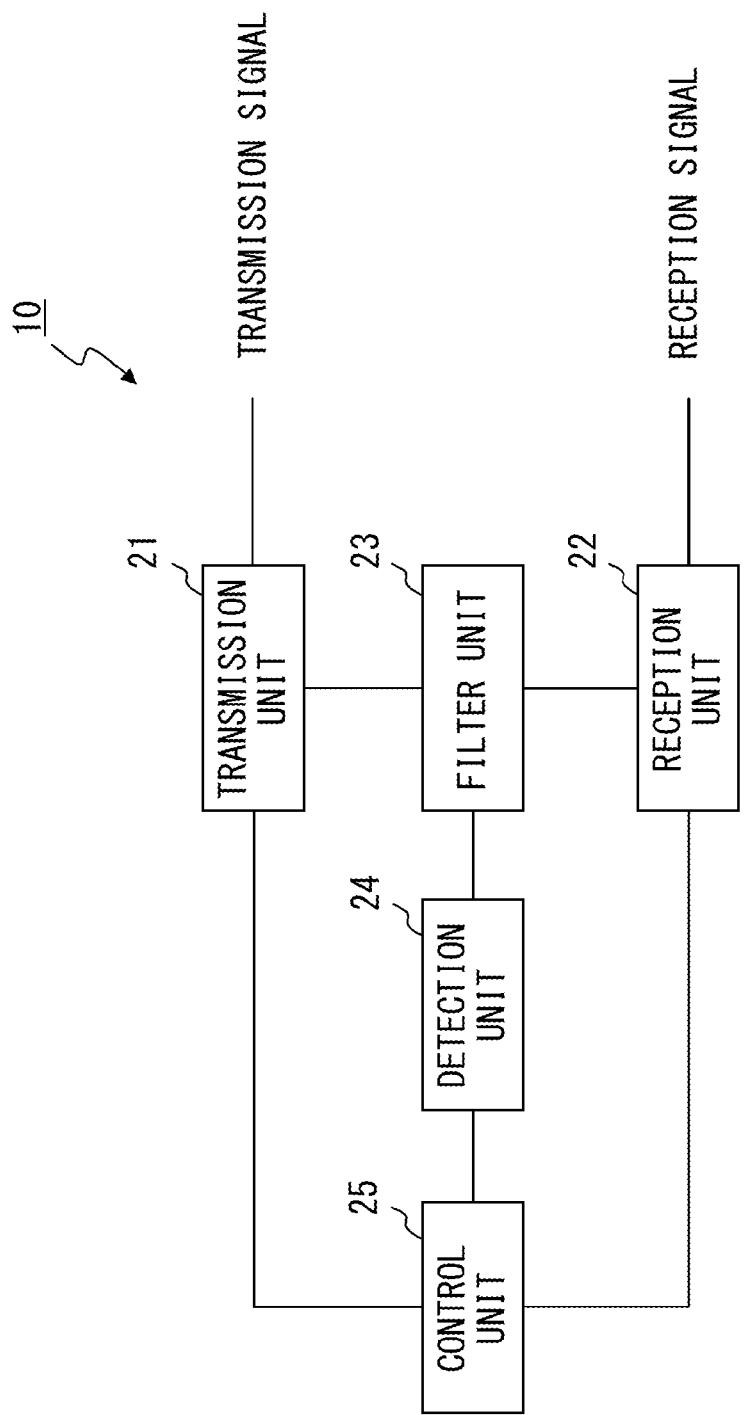
FIG. 2 is a function block diagram illustrating an example of the optical transmission device.

FIG. 2 is a function block diagram illustrating an example of the optical transmission device.

Explanations will be given for functions of the optical transmission device 10 by referring to FIG. 2.

In FIG. 2 the optical transmission device 10 includes a transmission unit 21, a reception unit 22, a filter unit 23, a detection unit 24, and a control unit 25.

The transmission unit 21 generates a multiplication signal by multiplying a main signal representing information input from the control unit 25 by a superimposition signal. Then, the transmission unit 21 modulates a sub-channel signal so that it represents a multiplication signal, and thereby generates a sub-channel signal on which a superimposition signal has been superimposed. Note that operations of the transmission unit 21 are referred to as superimposition of a superimposition signal on a sub-channel signal.

Also, the transmission unit 21 treats, as one super-channel signal, a plurality of sub-channel signals having identical destinations and having adjacent wavelengths. Also, the transmission unit 21 generates a WDM signal including a plurality of super-channel signals having different wavelengths, and transmits the WDM signal as a transmission signal to a destination specified by the control unit 25.

The reception unit 22 receives, as a reception signal, a WDM signal including a plurality of super-channel signals having different wavelengths. Also, the reception unit 22 receives a superimposition signal such as a main signal, a path ID signal, etc., from the network management system 11 and client lines.

The filter unit 23 is controlled by the control unit 25, and varies a central wavelength of a passband. When a super-channel signal transmitted from the transmission unit 21 has been input, the filter unit 23 filters part of two super-channel signals having adjacent wavelengths from among at least two super-channel signals.

Also, when super-channel signals received by the reception unit 22 have been input, the filter unit 23 filters the sub-channel signal on the shortest wavelength side or the longest wavelength side among the super-channel signals. Also, when filtering the super-channel signals received by the reception unit 22, the filter unit 23 includes a wavelength-dependent loss in passing beams of the super-channel signals.

The detection unit 24 converts, into an electric signal of a detection level that represents optical intensity, part of the two sub-channel signals that were input from the transmission unit 21 and filtered by the filter unit 23. For example, the detection unit 24 converts, into an electric signal of a detection level that is in proportion to optical intensity, part of the two sub-channel signals that were filtered by the filter unit 23.

Also, the detection unit 24 converts, into an electric signal of a detection level that represents optical intensity, sub-channel signals that were input from the reception unit 22 and filtered by the filter unit 23. For example, the detection unit 24 converts part of the two sub-channel signals that were filtered by the filter unit 23 into an electric signal of a detection level that is in proportion to optical intensity.

The control unit 25 adjusts a timing of superimposing a superimposition signal for each of the two sub-channel signals in such a manner that variation in detection levels of electric signals of a detection level representing the optical intensity of part of the two sub-channel signals converted by the detection unit 24 becomes smaller. Also, the control unit 25 controls the transmission unit 21 so that the same superimposition signal is superimposed on each of the two sub-channel signals.

When variation in detection levels of electric signals converted by the detection unit 24 has become smaller than a prescribed threshold, the control unit 25 controls the filter unit 23 and changes the passband of the filter unit 23 into a different passband. In the explanations below, it is assumed that a super-channel includes four sub channels. Also, the four sub channel signals are referred to as sub-channel signals 1 through 4, respectively.

The control unit 25 adjusts a timing of superimposing a superimposition signal on sub-channel signals 1 and 2 in such a manner that variation in detection levels of sub-channel signals 1 and 2 becomes smaller than a threshold. Next, the control unit 25 adjusts a timing of superimposing a superimposition signal on sub-channel signals 2 and 3 in such a manner that variation in detection levels of sub-channel signals 2 and 3 becomes smaller than a threshold. Further, the control unit 25 adjusts a timing of superimposing a superimposition signal on sub-channel signals 3 and 4 in such a manner that variation in detection levels of sub-channel signals 3 and 4 becomes smaller than a threshold. Thereby, the control unit 25 makes the respective timings of superimposing signals on sub-channel signals 1 through 4 roughly coincide.

In other words, the optical transmission device 10 can superimpose, at the same timing, the same superimposition signal on respective sub-channel signals included in a super-channel signal output from the transmission unit 21. Note that the order of selecting two sub-channel signals from the plurality of sub channels is not particularly limited. Also, the prescribed threshold may be stored in a storage device (not illustrated) included in the optical transmission device 10 or may be a value input by a user through an input unit (not illustrated).

Figure 3:
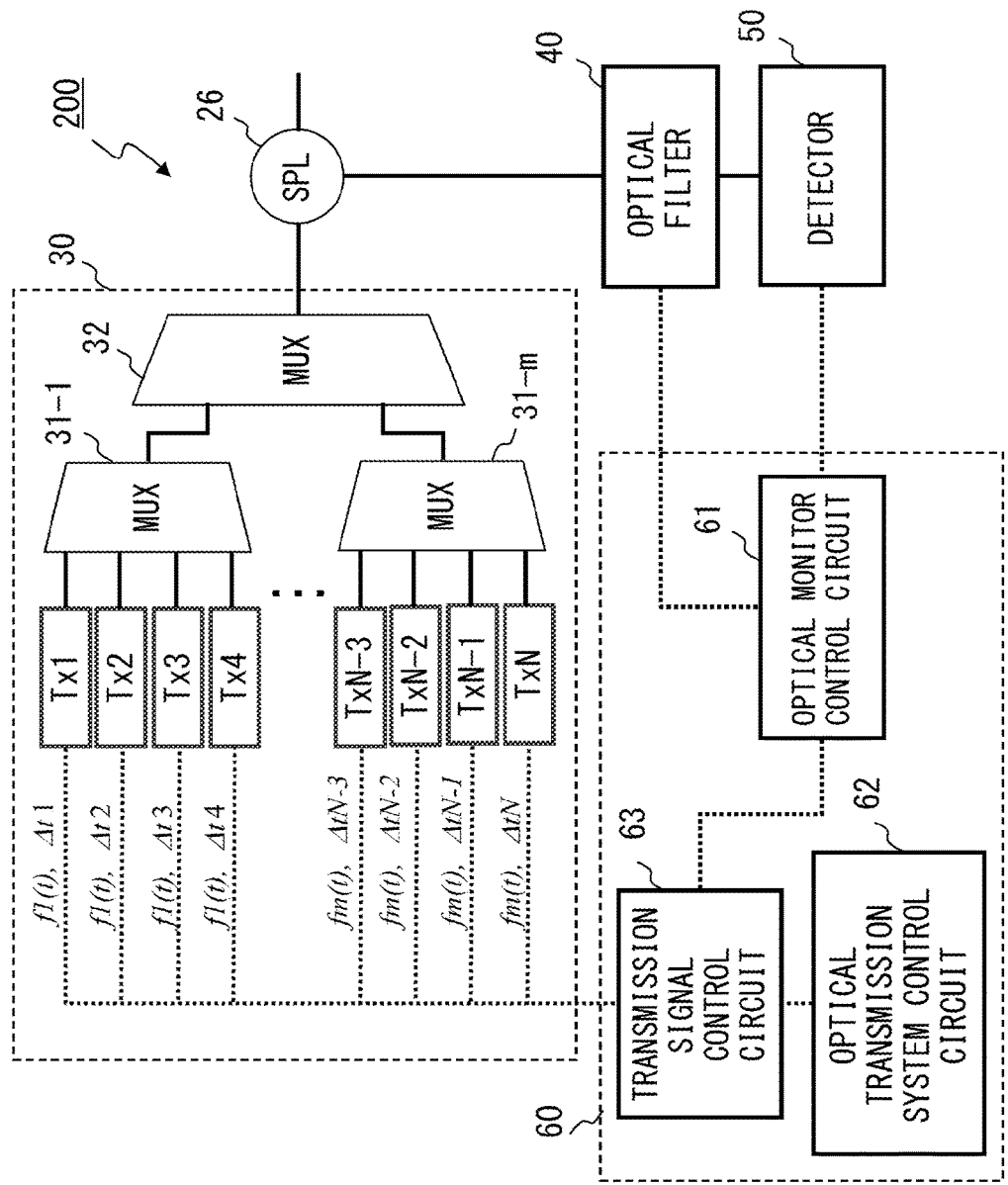
FIG. 3 is a block diagram illustrating an example of a transmission circuit.

FIG. 3 is a block diagram illustrating an example of a transmission circuit.

FIG. 3 illustrates a transmission circuit 200 of the optical transmission device 10.

In the explanations below, it is assumed that each super-channel signal includes four sub-channels. However, the number of sub channels included in a super-channel signal in an embodiment is not limited to four.

The transmission circuit 200 includes an optical splitter 26, a signal generation circuit 30, an optical filter 40, a detector 50, and a control circuit 60.

The optical splitter 26 splits a super-channel signal output from the signal generation circuit 30 so as to guide resultant signals to the optical filter 40.

The signal generation circuit 30 includes transmitters Tx1 through TxN and multiplexers (MUXs) 31-1 through 31-$m$ and 32. The signal generation circuit 30 functions as the transmission unit 21 in FIG. 2. Note that m is a natural number equal to or greater than one.

To transmitters TxN-3 through TxN, superimposition signals fm(t) of a frequency modulation method and delay amounts ΔtN-3 through ΔtN that were input from the control circuit 60 are input. The transmitters TxN-3 through TxN include the ΔtN-3 through ΔtN in the input respective superimposition signals fm(t), superimpose the signals on super-channel signals, and output the super-channel signals to the multiplexers 31. Note that N is a natural number equal to or greater than one. Also, ΔtN-3 through ΔtN are parameters for adjusting delay amounts of superimposition signals f1(t) through fm(t), and change relative phases of f1(t) through fm(t) when they are changed. In the explanations below, the indexes used for the transmitters, the superimposition signals, and the delay amounts are omitted unless they need to be distinguished.

Figure 4A:
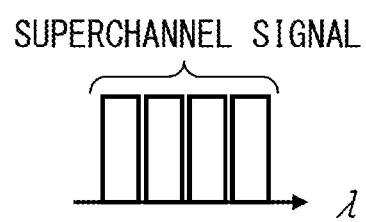
FIG. 4A illustrates an example of a super-channel signal.

The multiplexers 31-1 through 31-$m$ generate super-channel signals by multiplexing sub-channel signals output from the transmitters Tx1 through Tx4, . . . , TxN-3 through TxN. Signals output from the multiplexers 31-1 through 31-$m$ are super-channel signals each including four sub-channel signals having adjacent wavelengths, as illustrated in FIG. 4A.

Figure 4B:
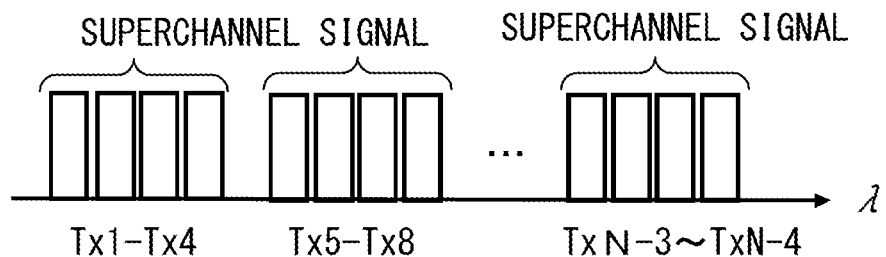
FIG. 4B illustrates an example of a super-channel signal.

The multiplexer 32 generates a WDM signal by multiplexing super-channel signals output from the multiplexers 31-1 through 31-$m$. Also, a signal output from the multiplexer 32 is a WDM signal including a plurality of super-channel signals having different wavelengths, as illustrated in FIG. 4B.

The optical filter 40 filters part of two adjacent sub-channel signals from among sub-channel signals included in the input super-channel signals. The optical filter 40 functions as the filter unit 23 in FIG. 2.

The detector 50 outputs an optical current in accordance with the optical intensity of an input super-channel signal. In other words, the detector 50 converts two super-channel signals filtered by the optical filter 40 into an electric signal. The detector 50 includes, for example, a photo diode. The detector 50 functions as the detection unit 24 in FIG. 2.

The control circuit 60 includes an optical monitor control circuit 61, an optical transmission system control circuit 62, and a transmission signal control circuit 63. The control circuit 60 functions as the control unit 25 in FIG. 2.

The optical monitor control circuit 61 measures differences between detection levels of electric signals repeatedly input from the detector 50. Also, the optical monitor control circuit 61 outputs to the transmission signal control circuit 63 differences between detection levels of electric signals input from the detector 50.

Also, when a difference between detection levels of electric signals input from the detector 50 has become equal to or smaller than a threshold, the optical monitor control circuit 61 performs control of switching of the band of the optical filter 40 in accordance with wavelength information input from the optical transmission system control circuit 62, which will be explained later. As an example, the optical monitor control circuit 61 recognizes the wavelength of each super-channel signal of a super-channel signal from the wavelength information, and performs control of switching of the band of the optical filter 40 to a band between the two adjacent sub channels each time a difference between detection levels of electric signals becomes equal to or smaller than a threshold.

The optical transmission system control circuit 62 outputs to the transmission signal control circuit 63 wavelengths of sub channels output from the transmitters Tx1 through TxN, information such as path IDs or the like that is transmitted by a superimposition signal, the wavelength of the super-imposition signal, and the wavelength deviation amount of the superimposition signal. A wavelength deviation amount may be given as a difference between wavelengths that represent "0" and in a frequency-modulated signal. Also, a wavelength deviation amount may be given as a difference between the center frequencies of wavelengths representing "0" and "1" in a frequency-modulated signal and wavelengths representing "0" and "1" in a frequency-modulated signal.

The optical transmission system control circuit 62 outputs wavelength information that is given by wavelengths of sub channels, the frequency of a superimposition signal, and the wavelength deviation amount of the superimposition signals that are output from the transmitters Tx1 through TxN to the optical monitor control circuit 61.

The transmission signal control circuit 63 outputs, to the transmitters Tx1 through TxN, wavelengths of sub channels, information transmitted by a superimposition signal, the frequency of the superimposition signal, and the wavelength deviation amount of the superimposition signal.

The transmission signal control circuit 63 changes delay amounts $\Delta t1$ through $\Delta tN$ input to the transmitters Tx1 through TxN in such a manner that the difference between detection levels of electric signals input from the optical monitor control circuit 61 becomes smaller. For example, the transmission signal control circuit 63 changes the delay amounts of superimposition signals to be superimposed on the two sub-channel signals that are being filtered by the optical filter 40. The transmission signal control circuit 63 checks the detection level each time it changes the delay amounts of the superimposition signals to be superimposed on the two super-channel signals being filtered, and repeats the changing of the delay amounts until the difference between the detection levels becomes smaller than a threshold. Specifically, it is also possible to fix the delay amount of the superimposition signal to be superimposed on one of the sub-channel signals while increasing or decreasing the delay amount of the superimposition signal to be superimposed on the other sub channel signal in such a manner that the difference in the detection levels of electric signals becomes smaller.

Figure 5:
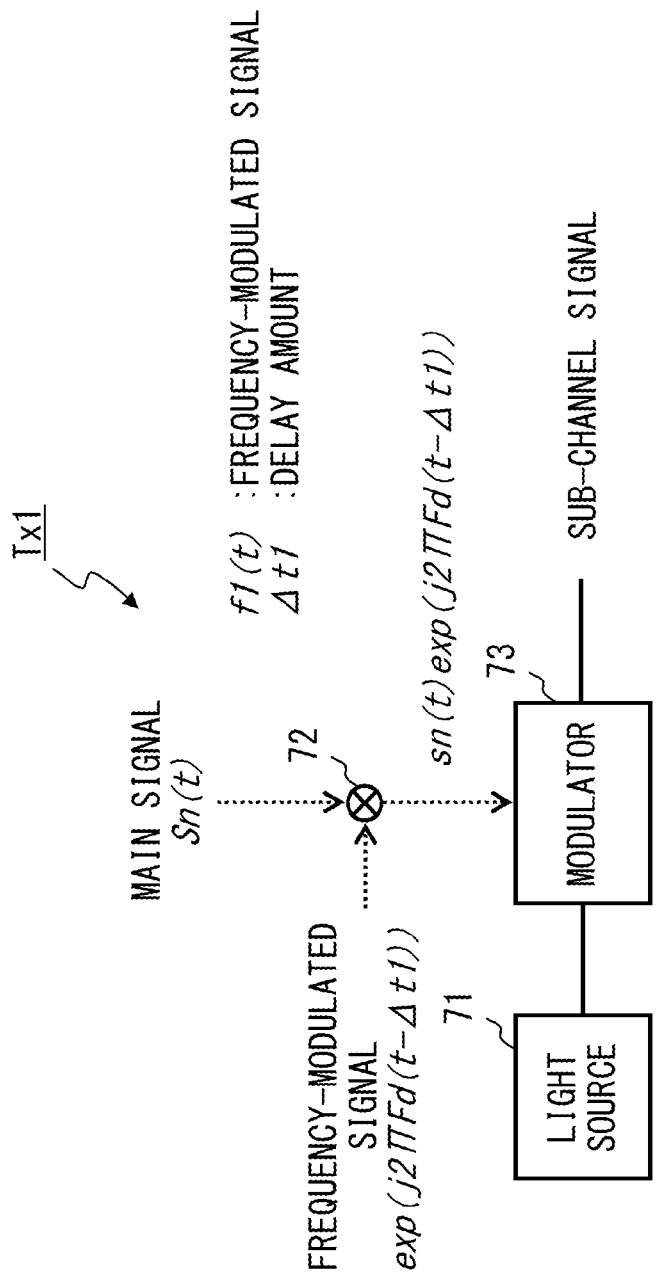
FIG. 5 is a block diagram illustrating an example of a transmitter.

FIG. 5 is a block diagram illustrating an example of the transmitter.

In the explanations below, the transmitter Tx1 is explained as an example. Note that explanations of the transmitters Tx2 through TxN will be omitted because they have a configuration identical to that of the transmitter Tx1.

The transmitter Tx1 illustrated in FIG. 5 includes a light source 71, a multiplier 72, and a modulator 73.

The light source 71 is, for example, a wavelength variable laser device, and generates continuous light according to the wavelength of a sub channel input from the optical transmission system control circuit 62.

The multiplier 72 multiplies main signal Sn(t) input from a client terminal (not illustrated) or the network management system 11 by superimposition signal $\exp(j2\pi fd(t-\Delta t1))$ including the delay amount input from the transmission signal control circuit 63. Then, the multiplier 72 inputs to the modulator 73 multiplication signal $Sn(t) \cdot \exp(j2\pi fd(t-\Delta t1))$, which is the result of multiplying the main signal by the superimposition signal.

When the multiplication signal is input from the multiplier 72, the modulator 73 modulates a sub channel by the multiplication signal, and outputs the sub-channel signal.

Figure 6:
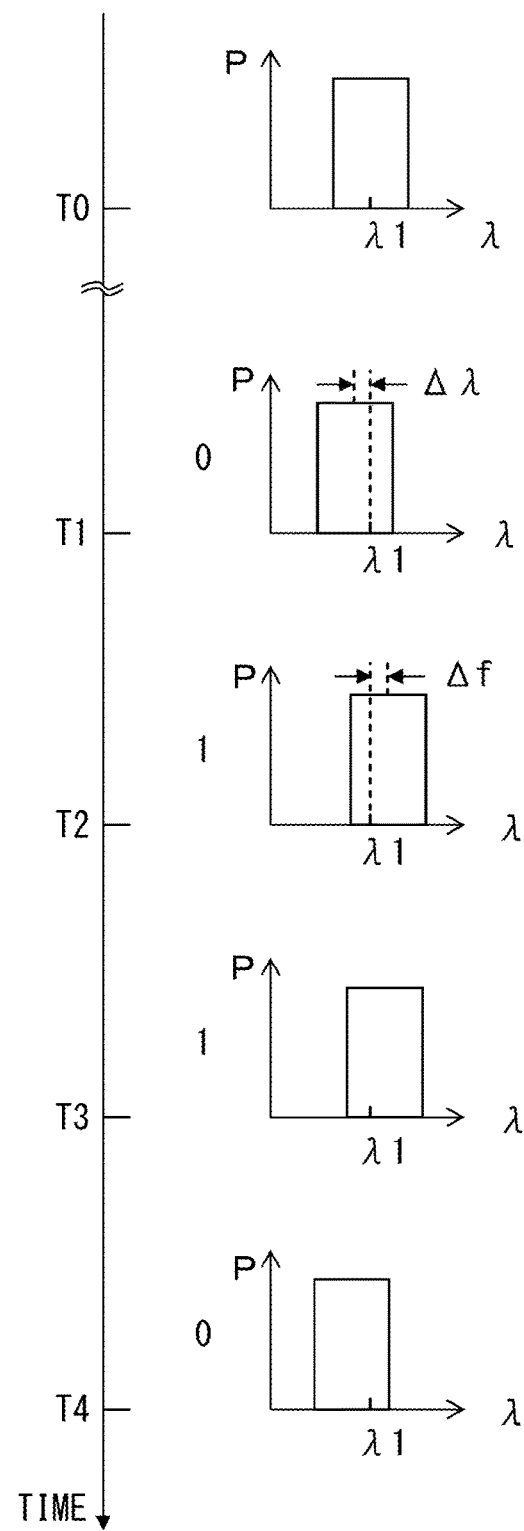
FIG. 6 explains the superimposition of a frequency modulation signal.

FIG. 6 explains the superimposition of a frequency-modulated signal.

In the explanations below, the transmitter Tx1 will be explained as an example. Note that the transmitters Tx2 through TxN superimpose superimposition signals on sub-channel signals similarly to the transmitter Tx1, and accordingly the explanations thereof will be omitted.

FIG. 6 illustrates the time division output spectrum of the transmitter Tx1 at times T0 and T1 through T4. Respective vertical axes P represent the optical intensity, while horizontal axes $\lambda$ represent the wavelengths of superimposition signals. The spread of the output optical spectrum at each time represents the spectrum spread caused in accordance with the high-speed modulation in the main signal, and may take various widths and shapes depending upon the modulation method and modulation speed of a sub-channel signal. A superimposition signal based on a frequency modulation method has been superimposed on a super-channel signal output from the transmitter Tx1. In the example illustrated in FIG. 6, frequency-modulated signals are digital codes, and the codes represented by the superimposition signals superimposed on sub-channel signals at times T1 through T4 are "0110". It is also assumed that the center wavelength of the sub channel used by the transmitter Tx1 is $\lambda 1$. In FIG. 6, the waveform of the output spectrum of a sub-channel signal is assumed as a waveform in the case of applying the embodiment to Nyquist-WDM, as an example.

At time T0, a superimposition signal has not been superimposed on a super-channel signal. In such a case, the transmitter Tx1 does not shift the sub-channel signal. Accordingly, the center of the spectrum of the sub-channel signal output at time T0 is $\lambda 1$.

At time T1, "0" is superimposed as a superimposition signal on a sub-channel signal. In such a case, the transmitter Tx1 shifts the wavelength of the sub-channel signal by $-\Delta\lambda$ (wavelength deviation amount of the superimposition signal). Accordingly, the center of the spectrum of the sub-channel signal output at time T1 is $\lambda 1-\Delta\lambda$.

At time T2, "1" is superimposed as a superimposition signal on a sub-channel signal. In such a case, the transmitter Tx1 shifts the wavelength of the sub-channel signal by $+\Delta\lambda$. Accordingly, the center of the spectrum of the sub-channel signal output at time T2 is $\lambda 1+\Delta\lambda$. Similarly, the center of the spectrum output at time T3 is $\lambda 1+\Delta\lambda$, and the center of the spectrum of the sub-channel signal output at time T4 is $\lambda 1-\Delta\lambda$.

$\Delta\lambda$ is sufficiently smaller than the wavelength of the sub channel. Also, $\Delta\lambda$ is determined in such a manner that no interference occurs between WDM signals.

In the example illustrated in FIG. 6, the wavelength deviation amounts in the cases when the superimposition signal is "0" and "1" are "$-\Delta\lambda$" and "$+\Delta\lambda$", respectively; however, the embodiments are not limited to this method. For example, the wavelength deviation amounts when the superimposition signal is "0" and "1" may be "$+\Delta\lambda$" and "$-\Delta\lambda$", respectively. Also, when the superimposition signal is "0 (or 1)" the wavelength deviation of the sub channel may be zero and when the superimposition signal is "1 (or 0)", the wavelength of the sub channel may be deviated. Further, the wavelength deviation amounts may be "$-\Delta\lambda$", "$-0.5\Delta\lambda$", "$+0.5\Delta\lambda$", and "$+\Delta\lambda$" when the four-value frequency phase shift keying is "00", "01", "10" and "11" for two bits of a superimposition signal. Further, multi-frequency phase shift keying other than two-value frequency phase shift keying or four-value frequency phase shift keying may be used for modulating a superimposition signal.

Although superimposition signals are digital signals in the embodiment illustrated in FIG. 6, substantially the same methods are used for deviating wavelengths even when superimposition signals are analog signals. However, when superimposition signals are analog signals, the wavelength deviation amount does not change discretely, but changes continuously.

Figure 7:
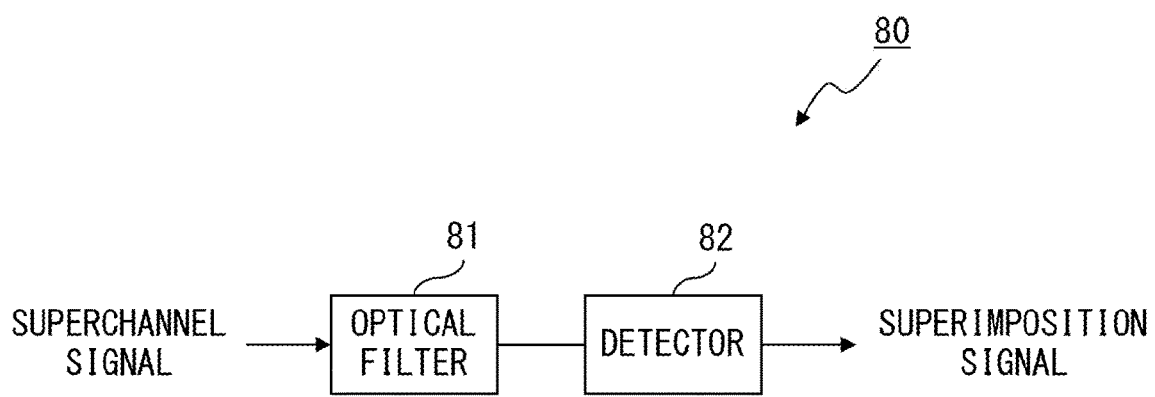
FIG. 7 is a block diagram illustrating an example of a reception circuit.

FIG. 7 is a block diagram illustrating an example of a reception circuit. FIG. 8 illustrates the passband of the optical filter of a reception circuit.

A reception circuit 80 according to an embodiment includes an optical filter 81 and a detector 82 as illustrated in FIG. 7.

The transmissivity (or loss) of the optical filter 81 depends on the wavelength (frequency) of a sub-channel signal. In other words, the optical filter 81 is a wavelength-dependent loss optical filter. This makes it possible to cause differences between values of intensity of the passing light of sub-channel signals by the difference in frequency between superimposition signals that are superimposed on the sub-channel signals. Accordingly, the detector 82 can cause a difference between detection levels of filtered sub-channel signals.

Also, the optical filter 81 is set to filter the edge portions of the sub-channel signal on the shortest wavelength side or on the longest wavelength side of a super-channel signal as illustrated in FIG. 8A and FIG. 8B. Thereby, the interval between the wavelength of the adjacent sub-channel signal and the wavelength of the sub-channel signal filtered by the optical filter 81 becomes wider, making it possible to reduce crosstalk. The optical filter 81 functions as the filter unit 23 in FIG. 2.

The passband of the optical filter 81 may be determined beforehand on the basis of the wavelength of the sub-channel signal used by the optical transmission device 10, or may be set by the control circuit 60 on the basis of the wavelengths of respective sub-channel signals used for a super-channel signal.

The passband and the wavelength-dependent loss of the optical filter 81 may be set as described below. It is assumed that a superimposition signal representing "1" has been superimposed on Tx1 through Tx4 and a superimposition signal representing "0" has been superimposed on Tx5 through Tx8 illustrated in FIG. 8A and FIG. 8B.

As illustrated in FIG. 8A and FIG. 8B, the optical filter 81 filters the edge portions of the sub-channel signals on the shortest wavelength side and the longest wavelength side of a super-channel signal so as to cause a difference between values of optical intensity of sub-channel signals. This makes it possible for the optical transmission device 10 to cause a difference between detection levels of filtered sub-channel signals that are detected by the detector 82. Note that the optical filter 81 does not have to have a wavelength-dependent loss when a difference between values of optical intensity of passing sub-channel signals can be caused by filtering the edge portion of a sub-channel signal on the shortest wavelength side or the longest wavelength side of a super-channel signal.

Further, when the edge portion of the sub-channel signal on the longest wavelength side is filtered as illustrated in FIG. 8A, it is desirable that the optical filter 81 be designed so that longer wavelengths increase the transmissivity while shorter wavelengths lower the transmissivity. Thereby, the switching between superimposition signals "1" and "0" switches the transmission regions of the wavelength on the longest wavelength side, making it possible to cause a difference between levels of optical intensity of passing sub-channel signals, as illustrated in FIG. 8A.

Also, when the edge portion of the sub-channel signal on the shortest wavelength side is filtered as illustrated in FIG. 8B, it is desirable that the optical filter 81 be designed so that longer wavelengths lower the transmissivity while shorter wavelengths increase the transmissivity. Thereby, the switching between superimposition signals "1" and "0" switches the transmission regions of the wavelength on the shortest wavelength side, making it possible to cause a difference between levels of optical intensity of passing sub-channel signals as illustrated in FIG. 8B.

The detector 82 outputs an optical current in accordance with the optical intensity of an input sub-channel signal. In other words, the detector 82 converts a sub-channel signal filtered by the optical filter 81 into an electric signal. The detector 82 includes, for example, a photo diode. The detector 82 functions as the detection unit 24 in FIG. 2.

Figures 9A, 9B:
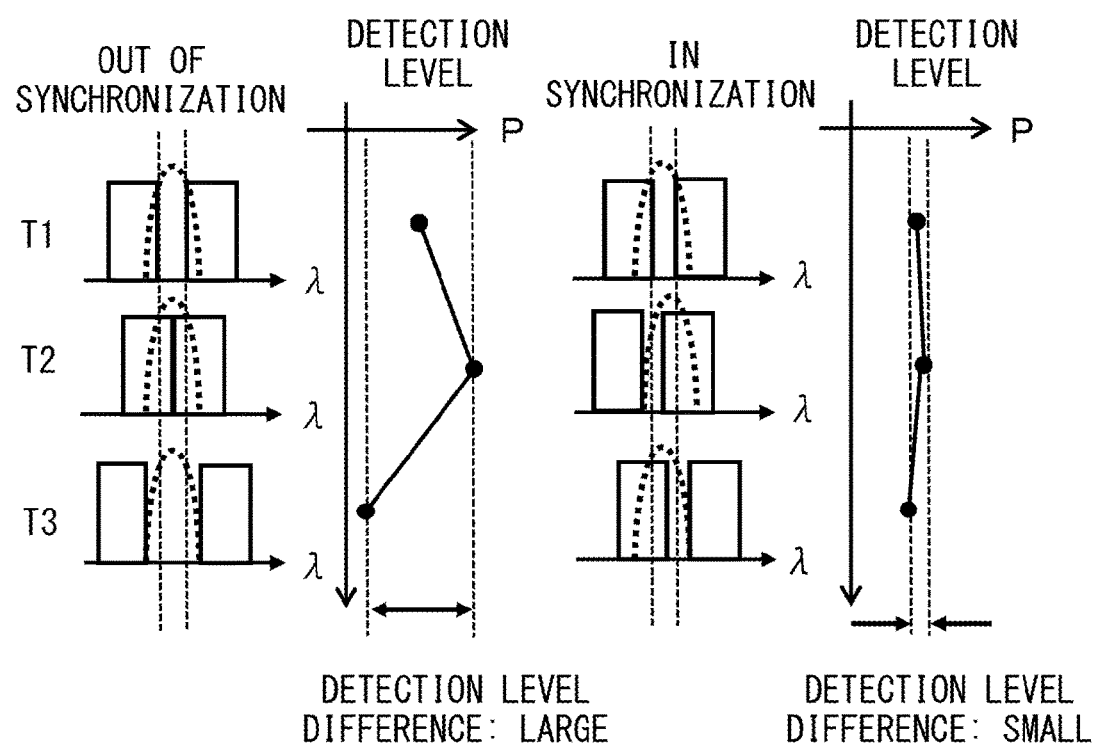
FIG. 9A illustrates a method of synchronizing sub-channel signals.
FIG. 9B illustrates a method of synchronizing sub-channel signals.

FIGS. 9A and 9B explain a method of synchronizing sub-channel signals.

FIG. 9A and FIG. 9B illustrate the spectrum of two adjacent sub-channel signals in a super-channel signal and a detection level of the detector 50 at the time of filtering the wavelength represented by the dashed lines. Also, T1 through T3 in FIG. 9A and FIG. 9B represent the points in time when the respective sub-channel signals are filtered.

In FIG. 9A, superimposition signals of two sub-channel signals are out of synchronization. In other words, in FIG. 9A, superimposition signals that are identical to each other but that switch their frequencies representing "1" and "0" at different timings have been superimposed on two sub-channel signals. Accordingly, the wavelength interval between the two sub-channel signals varies depending upon time. Accordingly, it is assumed that crosstalk occurs at time T2, at which the wavelength interval between sub-channel signals narrows in FIG. 9A. Also, as illustrated as the detection levels in FIG. 9A, the difference in the detection levels (also referred to as a detection level difference hereinafter) between times T1, T2 and T3 is large. In the upper view in FIG. 9A, for example, superimposition signals representing the same value "1" have been superimposed on two sub-channel signals. In the middle view in FIG. 9A, for example, superimposition signals representing "1" and "0" have been superimposed on two sub-channel signals. In the lower view in FIG. 9A, for example, superimposition signals representing "0" and "1" have been superimposed on two sub-channel signals.

In FIG. 9B, superimposition signals of two sub-channel signals are synchronized. In other words, superimposition signals having the same wavelength representing the same value are superimposed on two sub-channel signals at the same time. Accordingly, the wavelength interval between the two sub-channel signals is identical to the wavelength interval before the superimposition of the superimposition signals. Accordingly, it is possible to suppress the occurrence of crosstalk by setting wavelength intervals between sub-channel signals included in a super-channel signal to intervals that reduce crosstalk. Also, as illustrated as the detection levels in FIG. 9B, the difference in the detection levels between times T1, T2 and T3 is small.

Accordingly, the optical monitor control circuit 61 measures differences between detection levels of electric signals repeatedly input from the detector 50. The optical monitor control circuit 61 outputs to the transmission signal control circuit 63 the differences between detection levels of electric signals input from the detector 50.

The transmission signal control circuit 63 changes the delay amounts Δt1 through ΔtN repeatedly input to the transmitters Tx1 through TxN, in such a manner that the differences between detection levels of electric signals input from the optical monitor control circuit 61 becomes smaller, and thereby adjusts a timing of superimposing superimposition signals.

In the above described method, the optical transmission device 10 can synchronize superimposition signals that have been superimposed on sub-channel signals.

FIGS. 10A through 10C illustrate an example of setting of wavelength deviation amounts on the basis of frequency modulation.

The horizontal axes in FIG. 10A through FIG. 10C represent the wavelengths of sub-channel signals. The dashed lines in FIG. 10A through FIG. 10C represent the center wavelength of the passband of the optical filter 81. The dashed lines at the centers of the sub-channel signals represent the center frequencies of the sub-channel signals.

Hereinafter, an example of setting a wavelength deviation amount on the basis of frequency modulation will be explained by referring to FIGS. 10A through 10C.

As illustrated in FIG. 10A, when adjacent sub-channel signals are made to be the closest to each other, the center frequency of the passband of the optical filter 81 is made to be identical to the frequency of the middle of the center frequencies of the adjacent sub-channel signals.

Next, as illustrated in FIG. 10B, the wavelength deviation amount is set in such a manner that the detection level of two sub-channel signals filtered by the detector 50 becomes zero when wavelength deviation occurs in the state illustrated in FIG. 10A.

Also, the optical transmission device 10 checks the detection levels while making the center frequencies of the two sub-channel signals closer to the center frequency of the passband of the optical filter 81. For this check, the optical transmission device 10 sets the center frequencies of sub-channel signals in such a manner that the detection level becomes a prescribed value before superimposition signals are superimposed (when the superimposition signals of the sub-channel signals become synchronized).

When crosstalk has been suppressed when the center frequencies of the two sub-channel signals are determined, the wavelength deviation amount and the center frequencies of adjacent sub-channel signals are determined to be the set values.

It is desirable that a value be set as a prescribed value for a detection level in such a manner that sensitivity is high for a difference between when sub-channel signals are synchronized and when sub-channel signals are not synchronized.

When crosstalk has not been suppressed when the center frequencies of the two sub-channel signals are determined in FIG. 10C, the characteristics of the optical filter 81 and the prescribed value for a detection level are adjusted and the above procedures are repeated.

As described above, in the optical transmission device 10, it is desirable that the center frequencies of adjacent sub-channel signals and the wavelength deviation amount be optimized before the synchronization of sub-channel signals explained in FIGS. 9A and 9B. Thereby, crosstalk between adjacent channels does not occur, and the sensitivity for a difference between detection levels can be increased.

Figure 11:
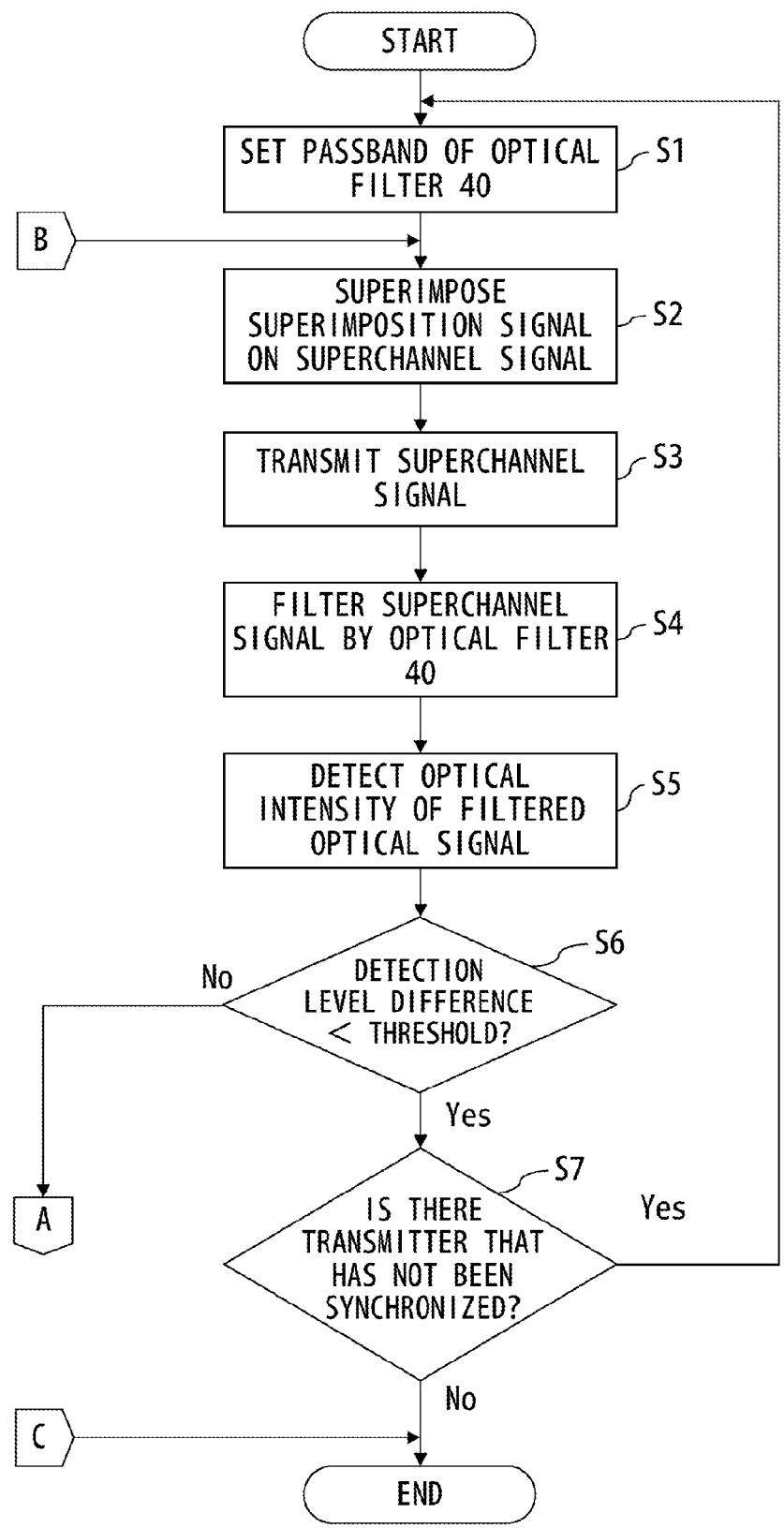
FIG. 11 is a flowchart explaining the contents of a synchronization process of sub channels.
Figure 12:
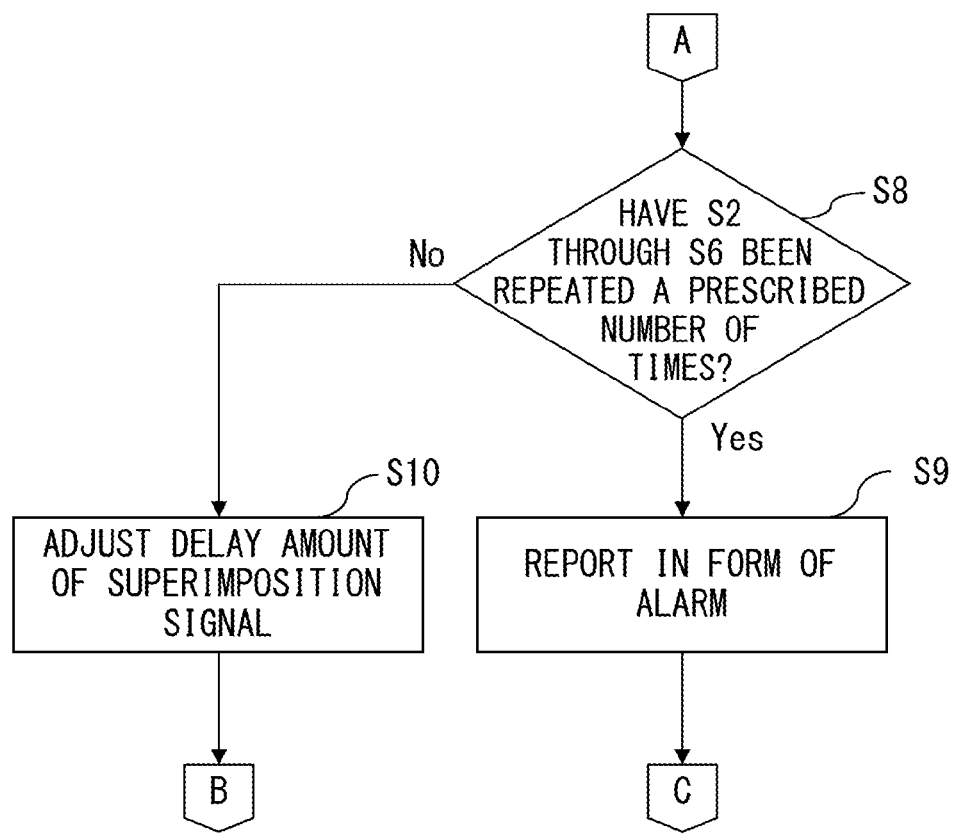
FIG. 12 is a flowchart explaining the contents of a synchronization process of sub channels.

FIG. 11 and FIG. 12 are flowcharts explaining the contents of a synchronization process of sub channels.

In the explanations based on FIG. 11, it is assumed as an example that a super-channel has four sub channels. It is also assumed that the respective sub-channel signals are referred to as sub-channel signals 1 through 4.

First, the control unit 25 sets a central wavelength of a passband of the optical filter 40 of the filter unit 23 to a wavelength band between sub channels 1 and 2 (S1).

Then, the control unit 25 controls the transmission unit 21 so as to make it superimpose superimposition signals on respective sub-channel signals (S2).

The transmission unit 21 transmits, as one super-channel signal, four sub-channel signals having adjacent wavelengths from among sub-channel signal on which superimposition signals have been superimposed (S3). Then, the super-channel signal is input to the filter unit 23 by the optical splitter 26.

When a super-channel signal has been input, the filter unit 23 filters sub-channel signals 1 and 2 at the same time, and outputs the signals to the detection unit 24 (S4). When the synchronization of sub-channel signals 1 and 2 is terminated, the filter unit 23 filters sub-channel signals 2 and 3 at the same time. Also, when the synchronization of sub-channel signals 2 and 3 is terminated, the filter unit 23 filters sub-channel signals 3 and 4 at the same time.

The detection unit 24 outputs the detection levels representing values of optical intensity of the two filtered sub-channel signals 1 and 2 that were input from the filter unit 23 (S5). S1 through S5 are repeated at least twice, and thereafter the process proceeds to S6.

The control unit 25 calculates a detection level difference, and executes S7 when the detection level difference of an electric signal converted by the detection unit 24 is smaller than a threshold (YES in S6). It is also possible for the control unit 25 to use the average of obtained detection level differences when S1 through S5 are repeated a plurality of number of times and a plurality of detection level differences are obtained.

The control unit 25 executes S1 when the transmission unit 21 includes a transmitter that has not been synchronized (YES in S7). The control unit 25 terminates the synchronization process when the transmission unit 21 does not include a transmitter that has not been synchronized (NO in S7).

When the detection level difference between electric signals converted by the detection unit 24 is greater than a prescribed threshold, S8 in FIG. 12 is executed.

When S2 through S6 have been repeated a prescribed number of times or more (YES in S8), the control unit 25 determines that it is not possible to synchronize sub-channel signals, and reports in a form of an alarm to a user that synchronization of sub-channel signals is not possible (S9). Then, the control unit 25 terminates the synchronization process. Also, a number of times that is stored in a storage unit (not illustrated) before hand may be used as a prescribed number of times. Also, reporting to a user is not limited to a form of an alarm, and may be in a form of information displayed on a display device.

When S2 through S6 have not been repeated a prescribed number of times or more (NO in S8), the control unit 25 executes S2 by adjusting the delay amounts of superimposition signals (S10).

By executing the above processes, the optical transmission device 10 can synchronize superimposition signals to be superimposed on respective sub-channel signals of a super-channel signal. Also, when it is not possible to synchronize superimposition signals to be superimposed on respective sub-channel signals of a super-channel signal, the optical transmission device 10 may report that fact to a user as an abnormal situation.

Figure 13:
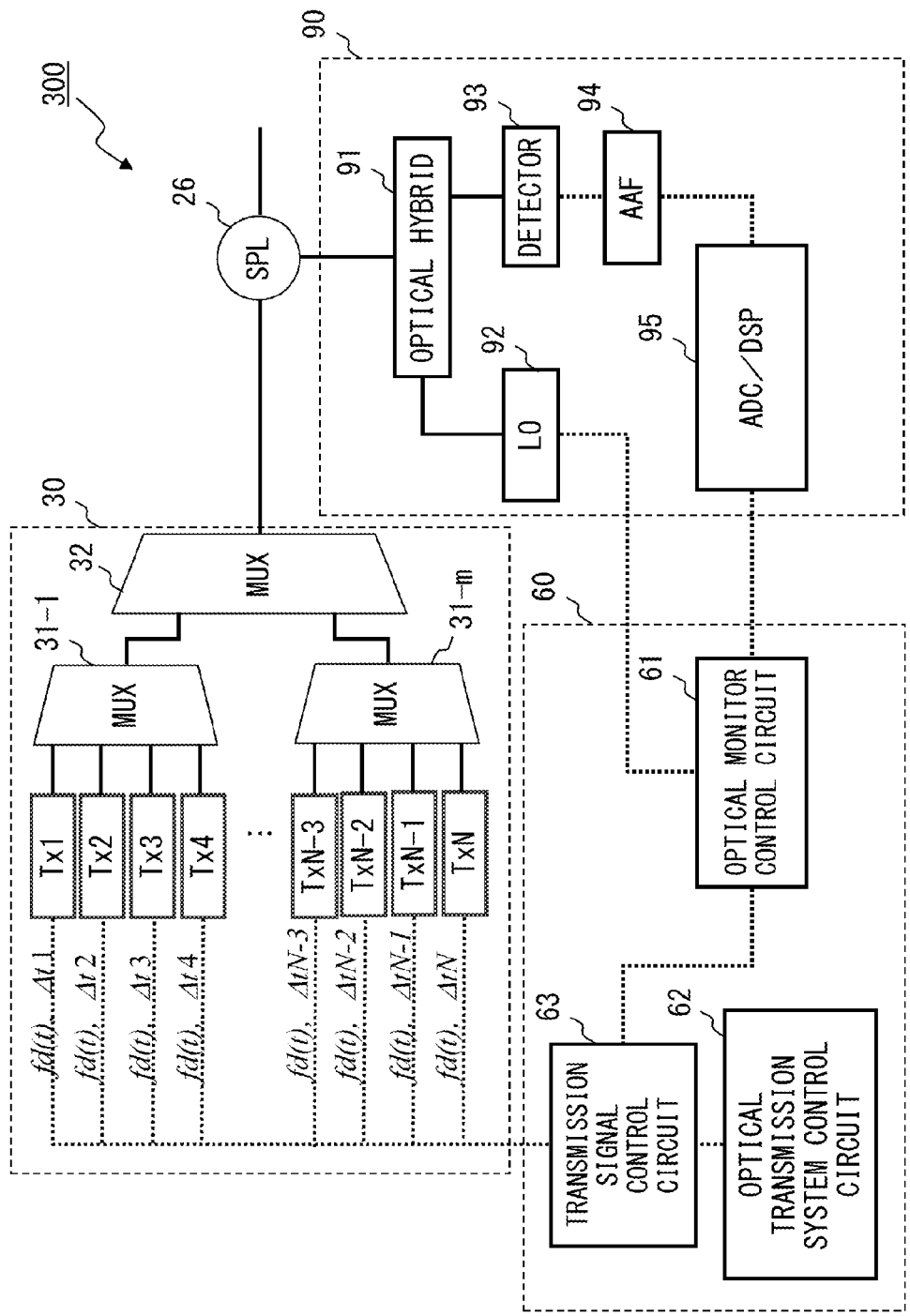
FIG. 13 illustrates another example of the optical transmission device.

FIG. 13 illustrates another example of the optical transmission device.

Constituents similar to those in FIG. 3 are denoted by the same symbols, and their explanations will be omitted.

FIG. 13 illustrates a configuration in which a coherent receiver 90 is used for obtaining detection levels of two adjacent sub-channel signals instead of using the optical filter 40 and the detector 50 illustrated in FIG. 3.

The coherent receiver 90 includes an optical hybrid 91, local oscillation light (LO) 92, a detector 93, an anti-aliasing filter (AAF) 94, and an ADC/DSP 95.

The coherent receiver 90 performs down conversion on a super-channel signal input from the optical splitter 26, into a value close to the baseband by using the optical hybrid 91 and the local oscillation light 92, and inputs the result to the detector 93. The detector 93 converts a plurality of sub-channel signals included in the input super-channel signal into a plurality of electric signals, and inputs the signals to the AAF 94.

The ADC/DSP 95 filters part of two electric signals having adjacent wavelengths from among a plurality of electric signals that passed through the AAF 94, and outputs the detection levels representing the intensity of the filtered two electric signals to the control circuit 60.

The other constituents are the same as those explained in FIG. 3.

Figure 14:
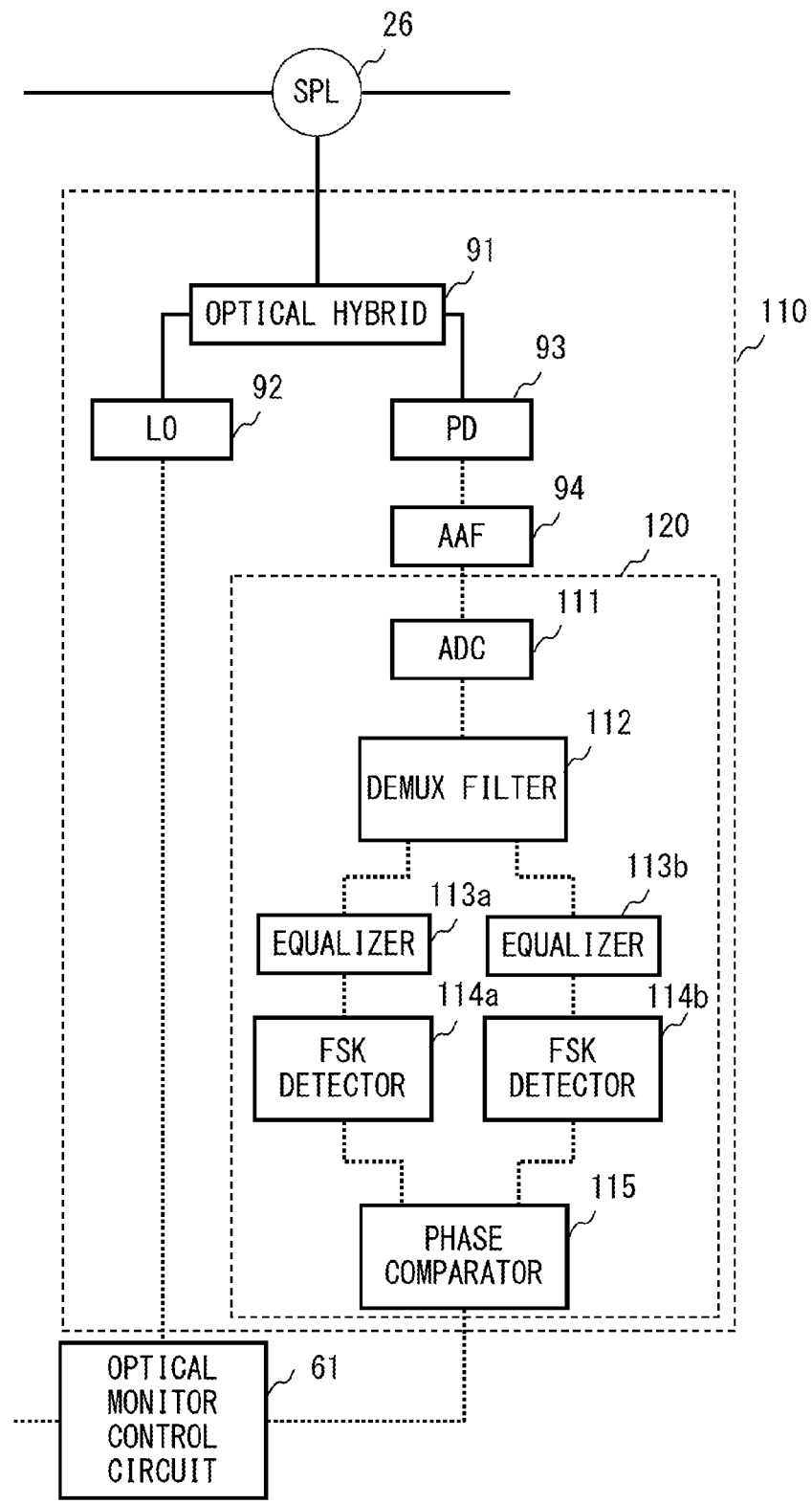
FIG. 14 illustrates another example of the optical transmission device.

FIG. 14 illustrates another example of the optical transmission device.

FIG. 14 illustrates a configuration in which a coherent receiver 110 is used instead of the coherent receiver 90 illustrated in FIG. 13. Constituents similar to those in FIG. 13 are denoted by the same symbols, and their explanations will be omitted.

The coherent receiver 110 inputs a plurality of electric signals from the AAF 94 to the ADC/DSP 120.

The ADC/DSP 120 includes an ADC 111, a deMUX filter 112, equalizers 113a and 113b, FSK detectors 114a and 114b, and a phase comparator 115. Also, the deMUX filter 112, the equalizers 113a and 113b, the FSK detectors 114a and 114b, and the phase comparator 115 in the ADC/DSP 120 are realized by a digital signal process by a DSP.

The ADC 111 performs analog-digital conversion on a plurality of input electric signals, and inputs the resultant signals to the deMUX filter 112. The deMUX filter 112 separates two electric signals having adjacent wavelengths among the plurality of input electric signals by a digital signal process. The equalizers 113a and 113b respectively shape wavelength distortions of the two electric signals obtained by the separation. The FSK detectors 114a and 114b use a frequency offset compensation algorithm so as to demodulate two superimposition signals from the two electric signals after the separation. The phase comparator 115 compares the phases of the two demodulated superimposition signals, and outputs the phase comparison result to the control circuit 60. The control circuit 60 refers to the input phase comparison result so as to adjust the delay amounts of superimposition signals to be superimposed on the corresponding two sub-channel signals in such a manner that the phases become identical. The optical transmission device 10 changes the two electric signals separated by the deMUX filter 112 each time the phases of superimposition signals to be superimposed on two sub-channel signals become identical. Thereby, the optical transmission device 10 can synchronize superimposition signals of respective sub-channel signals.

Figure 15:
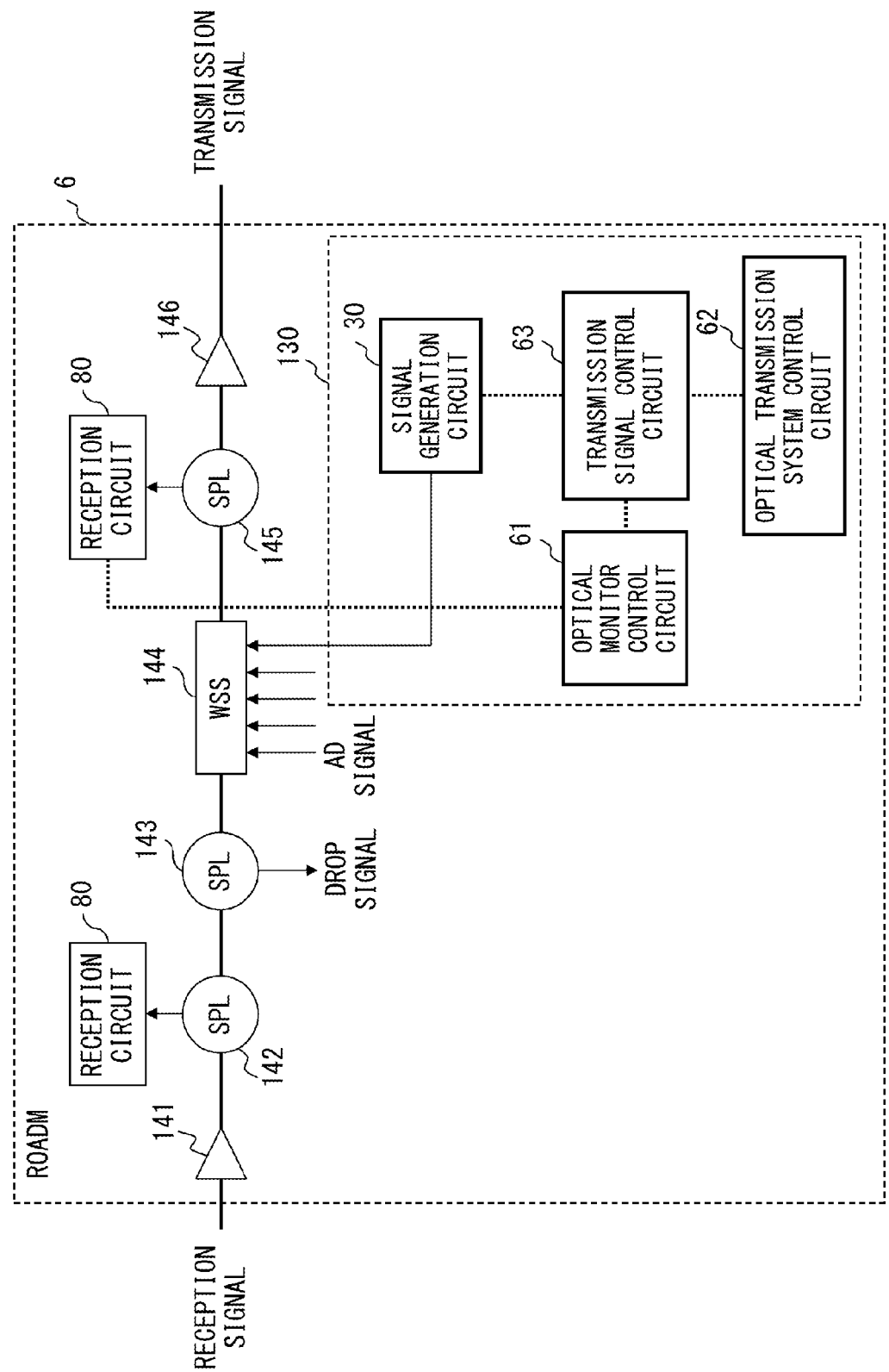
FIG. 15 is a block diagram illustrating an example of a node device having the optical transmission device.
Figure 16:
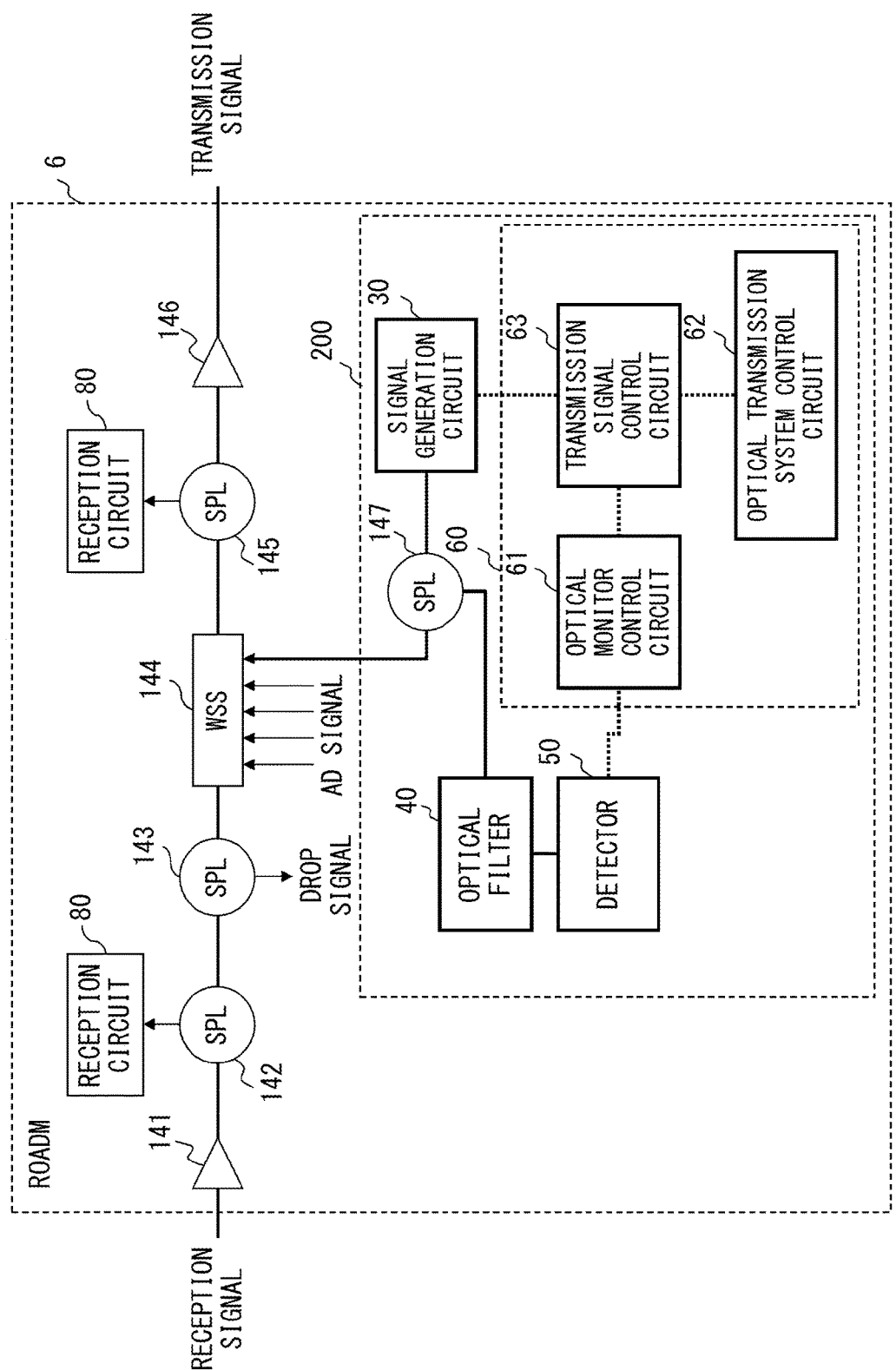
FIG. 16 is a block diagram illustrating an example of a node device having the optical transmission device.

FIG. 15 and FIG. 16 are block diagrams illustrating an example of a node device having the optical transmission device.

FIG. 15 and FIG. 16 illustrate a configuration that uses the optical transmission device 10 of an embodiment as the reconfigurable optical add/drop multiplexer 6; however, the optical transmission device 10 may be used as the reconfigurable optical add/drop multiplexers 7 and 8 and the wavelength cross connect 9.

The reconfigurable optical add/drop multiplexer 6 illustrated in FIG. 15 includes optical amplifiers 141 and 146, and optical splitters 142, 143, and 145, a wavelength selective switch (WSS) 144, a reception circuit 80, and a transmission circuit 130.

The optical amplifier 141 amplifies an input WDM signal. The optical splitter 142 guides the WDM signal amplified by the optical amplifier 141 to the reception circuit 80, and also guides the WDM signal to the splitter 143. The splitter 143 guides the WDM signal input from the optical splitter 142 to the wavelength selective switch 144, and splits the WDM signal so as to generate a drop signal. A drop signal is guided to, for example, a wavelength selective branching device or a demultiplexer (not illustrated). The wavelength selective branching device selects a specified wavelength from a drop signal so as to guide the wavelength to a client terminal. The demultiplexer separates the drop signal for each wavelength. In such a case, some or all of a plurality of super-channel signals obtained by the demultiplexer are guided to a client terminal.

The wavelength selective switch 144 selects a wavelength specified by the input WDM signal and an ad signal. The wavelength selective switch 144 includes a plurality of input ports. In other words, the wavelength selective switch 144 includes ports that receive one or a plurality of ad signals, in addition to a port that receives an input WDM signal. Also, the wavelength selective switch 144 may include a plurality of output ports.

The optical splitter 145 splits a WDM signal input from the wavelength selective switch 144, and guides the resultant signals to the reception circuit 80 and the optical amplifier 146. The optical amplifier 146 amplifies the WDM signal input from the optical splitter 145.

The operation of the reception circuit 80 is as described with reference to FIG. 7. In other words, the sub-channel signals on the shortest wavelength side and the longest wavelength side from among a plurality of sub-channel signals in a super-channel signal are filtered by the optical filter 81 that has a wavelength dependent loss. The reception circuit 80 generates an electric signal of a detection level representing the optical intensity from the sub-channel signals filtered by the optical filter 81.

Also, the transmission circuit 130 employs a configuration that uses the optical filter 40 of the transmission circuit 200 and the detector 50 instead of the reception circuit 80. Accordingly, the operation of the transmission circuit 130 is the same as that of the transmission circuit 200 explained with reference to FIG. 3.

The reconfigurable optical add/drop multiplexer 6 illustrated in FIG. 16 includes the optical amplifiers 141 and 146, the optical splitters 142, 143, and 145, the wavelength selective switch 144, the reception circuit 80, and the transmission circuit 200.

The configuration of the reconfigurable optical add/drop multiplexer 6 illustrated in FIG. 16 uses the transmission circuit 200 of FIG. 3 instead of the transmission circuit 130 of FIG. 15.

Accordingly, the operation of the reconfigurable optical add/drop multiplexer 6 illustrated in FIG. 16 is the same as that of the reconfigurable optical add/drop multiplexer 6 explained in FIG. 15.

The node device illustrated in FIG. 15 and FIG. 16 is an example, and the optical transmission device 10 according to the embodiments may be applied to node devices employing other configurations.

As described above, the optical transmission device 10 according to an embodiment can superimpose superimposition signals that are identical and that switch at the same timing on respective sub-channel signals included in a super-channel signal. Accordingly, even when superimposition signals have been superimposed on respective sub-channel signals included in a super-channel signal, the optical transmission device can keep the wavelength intervals between the respective sub-channel signals to the set intervals, making it possible to suppress crosstalk between the sub-channel signals.

Also, the optical transmission device 10 according to the embodiments filters the edge portion of the sub-channel signal on the shortest wavelength side or the longest wavelength side of a super-channel signal. Thereby, the interval between the wavelength of the adjacent sub-channel signal and the wavelength of the sub-channel signal filtered by the optical filter 81 becomes wider, making it possible to reduce crosstalk.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device, comprising:
   a transmission unit configured to superimpose superimposition signals on a plurality of optical signals that have identical destinations and that have adjacent wavelengths and to transmit resultant signals as one communication signal, the superimposition signals being frequency-modulated signals;
   a filter unit configured to filter part of two optical signals having adjacent wavelengths from among the plurality of optical signals included in the communication signal;
   a detection unit configured to generate an electric signal of a detection level representing an optical intensity of the two optical signals that were filtered by the filter unit; and
   a control unit configured to execute a process in which identical superimposition signals are superimposed on the plurality of respective optical signals by controlling the transmission unit so as to adjust timings of superimposing the superimposition signals on the two optical signals respectively so that variation in the detection level becomes smaller.

2. The optical transmission device according to claim 1, wherein:
   a center frequency of a passband of an optical filter included in the filter unit is set to a center frequency between bands of the two optical signals.

3. The optical transmission device according to claim 1, wherein:
   the optical filter of the filter unit is an optical filter that can vary a central wavelength of a passband; and
   the process executed by the control unit further includes:
   changing a passband of the optical filter to a different band when the variation in the detection level has become equal to or smaller than a set value.

4. The optical transmission device, comprising:
   a transmission unit configured to superimpose superimposition signals on a plurality of optical signals that have identical destinations and that have adjacent wavelengths and to transmit resultant signals as one communication signal, the superimposition signals being frequency-modulated signals; and
   a coherent reception unit configured to generate a plurality of electric signals respectively corresponding to the plurality of optical signals included in the communication signal, to filter part of two electric signals having adjacent wavelengths from among the plurality of electric signals, and to obtain a detection level representing an intensity of the filtered two electric signals; and
   a control unit configured to execute a process in which identical superimposition signals are superimposed on the plurality of respective optical signals by controlling the transmission unit so as to adjust timings of superimposing the superimposition signals on the two optical signals respectively so that variation in the detection level becomes smaller.

5. An optical transmission device, comprising:
   a transmission unit configured to superimpose superimposition signals on a plurality of optical signals that have identical destinations and that have adjacent wavelengths and to transmit resultant signals as one communication signal, the superimposition signals being frequency-modulated signals;
   a coherent reception unit configured to generate a plurality of electric signals respectively corresponding to the plurality of optical signals included in the communication signal, to separate two electric signals having adjacent wavelengths from among the plurality of electric signals, and to extract two superimposition signals from the separated two electric signals; and
   a control unit configured to execute a process in which identical superimposition signals are superimposed on the plurality of respective optical signals by controlling the transmission unit so as to adjust timings of superimposing the superimposition signals on the two optical signals respectively so that phases of the two superimposition signals become identical.

6. A node device, comprising:
   a transmission unit configured to superimpose superimposition signals on a plurality of optical signals that have identical destinations and that have adjacent wavelengths and to transmit resultant signals as one communication signal, the superimposition signals being frequency-modulated signals;
   a filter unit configured to filter part of two optical signals having adjacent wavelengths from among the plurality of optical signals included in the communication signal;
   a detection unit configured to generate an electric signal of a detection level representing an optical intensity of the two optical signals that were filtered by the filter unit; and
   a control unit configured to execute a process in which identical superimposition signals are superimposed on the plurality of respective optical signals by controlling the transmission unit so as to adjust timings of superimposing the superimposition signals on the two optical signals respectively so that variation in the detection level becomes smaller.

7. An optical transmission method executed by an optical transmission device, the optical transmission method comprising:
   superimposing identical superimposition signals on a plurality of optical signals that have identical destinations and that have adjacent wavelengths, the superimposition signals being frequency-modulated signals;
   transmitting the plurality of optical signals on which the superimposition signals have been superimposed, as one communication signal;
   filtering part of two optical signals having adjacent wavelengths from among the plurality of optical signals included in the transmitted communication signal;

generating an electric signal of a detection level representing an optical intensity of the two optical signals that were filtered; and adjusting timings of superimposing the superimposition signals on the two optical signals respectively so that variation in the detection level becomes smaller.

8. The optical transmission method according to claim 7, comprising:

receiving a communication signal from a different optical transmission device;

filtering an optical signal on a shortest wavelength side or a longest wavelength side from among a plurality of optical signals included in the received communication signal, by using an optical filter having a wavelength-dependent loss; and generating an electric signal of a detection level representing an optical intensity of the filtered optical signal on a shortest wavelength side or a longest wavelength side.

9. An optical transmission system including a first optical transmission device and a second optical transmission device, wherein:

the first optical transmission device includes:

a transmission unit configured to superimpose superimposition signals on a plurality of optical signals that have identical destinations and that have adjacent wavelengths and to transmit resultant signals as one communication signal, the superimposition signals being frequency-modulated signals;

a control unit configured to execute a process in which the transmission unit is controlled and identical superimposition signals are superimposed on the plurality of respective optical signals;

a first filter unit configured to filter part of two optical signals having adjacent wavelengths from among the plurality of optical signals included in the communication signal; and a first detection unit configured to generate an electric signal of a first detection level representing an optical intensity of the two optical signals that were filtered by the first filter unit;

the second optical transmission device includes:

a reception unit configured to receive the communication signal;

a second filter unit configured to filter an edge portion of an optical signal on a shortest wavelength side or a longest wavelength side from among the plurality of optical signals included in the received communication signal by using an optical filter having a wavelength-dependent loss; and a second detection unit configured to generate an electric signal of a second detection level representing an optical intensity of the optical signal filtered by the second filter unit; and the process executed by the control unit further executes a process in which identical superimposition signals are superimposed on the plurality of respective optical signals by controlling the transmission unit so as to adjust timings of superimposing the superimposition signals on the two optical signals respectively so that variation in the detection level becomes smaller.

* * * * *